US012620012B2

(12) United States Patent
Takeuchi

(10) Patent No.: US 12,620,012 B2
(45) Date of Patent: May 5, 2026

(54) SEARCH RESULT PAGE TRANSMISSION DEVICE, SEARCH RESULT PAGE TRANSMISSION METHOD, AND SEARCH RESULT PAGE TRANSMISSION PROGRAM

(71) Applicant: Rakuten Group, Inc., Tokyo (JP)

(72) Inventor: Hideyuki Takeuchi, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 162 days.

(21) Appl. No.: 18/491,982

(22) Filed: Oct. 23, 2023

(65) Prior Publication Data

US 2024/0144341 A1 May 2, 2024

(30) Foreign Application Priority Data

Nov. 2, 2022 (JP) ................................. 2022-176738

(51) Int. Cl.
*G06Q 30/0601* (2023.01)
(52) U.S. Cl.
CPC ................................. *G06Q 30/0627* (2013.01)
(58) Field of Classification Search
None
See application file for complete search history.

(56) References Cited

U.S. PATENT DOCUMENTS

2014/0188667 A1* 7/2014 Vuong ............... G06Q 30/0627
705/26.63
2014/0188842 A1* 7/2014 Vuong ............... G06F 16/9038
707/722

2017/0345088 A1* 11/2017 Trujillo .............. G06Q 30/0643
2020/0005387 A1* 1/2020 Rav-Acha .......... G06Q 30/0627
2022/0261869 A1* 8/2022 Hong ................... G06F 40/247

FOREIGN PATENT DOCUMENTS

WO 2016/084230 A1 6/2016

OTHER PUBLICATIONS

B. Vaclav, A. Eckhardt and P. Vojtas, "Pref Shop A Web Shop with User Preference Search Capabilities," 2010 IEEE/WIC/ACM International Conference on Web Intelligence and Intelligent Agent Technology, Toronto, ON, Canada, 2010, pp. 330-333, doi:10.1109/WI-IAT.2010.295. (Year: 2010).*

* cited by examiner

*Primary Examiner* — Michelle T Kringen
(74) *Attorney, Agent, or Firm* — Sughrue Mion, PLLC

(57) ABSTRACT

The search result page transmission device searches for at least one of a common attribute and an individual attribute that satisfy search criteria from a storage that stores the common attribute shared by a plurality of items and an individual attributes of each of the plurality of items. Each of the plurality of items is selectable as a purchase target in an item web page. When the common attribute satisfies the search criteria and the search criteria does not include a criteria corresponding to individual attributes, the search result page transmission device includes first item information common to the plurality of items in the search result web page. When at least one of the individual attributes satisfies the search criteria, the search result page transmission device includes the second item information on the item having the individual attribute satisfying the search criteria in the search result web page.

7 Claims, 17 Drawing Sheets

"T-SHIRT BLACK L" IS ATTRIBUTE OF ONLY T-SHIRT 160

DISPLAY SKU IMAGE 230

CATEGORY DB 14a

| CATEGORY DB |
|---|
| CATEGORY ID |
| CATEGORY NAME |
| LEVEL |
| PARENT CATEGORY ID |
| CHILD CATEGORY ID LIST |
| ATEGORY ATTRIBUTE DEFINITION INFORMATION |
| ATEGORY ATTRIBUTE DEFINITION INFORMATION |
| ⋮ |

ITEM PAGE LEVEL INFORMATION TABLE 14b1

| ITEM PAGE LEVEL INFORMATION TABLE |
|---|
| ITEM ID |
| STORE ID |
| CATEGORY INFORMATION |
| ITEM NAME |
| ITEM DESCRIPTION |
| POINT RATE |
| ITEM IMAGE ID |
| ITEM IMAGE ID |
| ⋮ |
| ITEM PAGE URL |
| NUMBER OF SKU |
| VARIATION ATTRIBUTE DEFINITION INFORMATION 1 |
| VARIATION ATTRIBUTE DEFINITION INFORMATION 2 |
| ⋮ |

SKU LEVEL INFORMATION TABLE 14b2

| SKU LEVEL INFORMATION TABLE |
|---|
| SKU MANAGEMENT ID |
| ITEM ID |
| STORE ID |
| PRODUCT CODE |
| VARIATION ATTRIBUTE INFORMATION 1 |
| VARIATION ATTRIBUTE INFORMATION 2 |
| ⋮ |
| PRICE |
| QUANTITY IN STOCK |
| SKU IMAGE ID |
| SKU IMAGE ID |
| ⋮ |
| SHIPPING COST |
| DELIVERY DATE |
| OTHER ATTRIBUTE |
| OTHER ATTRIBUTE |
| ⋮ |

FIG.5

ITEM PAGE LEVEL INFORMATION TABLE 14b1

| ITEM ID | STORE ID | CATEGORY ID | ITEM NAME | ITEM DESCRIPTION | ITEM IMAGE ID | VARIATION ATTRIBUTE DEFINITION INFORMATION 1 | VARIATION ATTRIBUTE DEFINITION INFORMATION 2 | SKU NUMBER | ... |
|---|---|---|---|---|---|---|---|---|---|
| 00000001 | 12345678 | T-SHIRT | ABC T-SHIRT | SIMPLE... | ITEM IMAGE 210 | COLOR: WHITE, BLACK | SIZE: S, M, L | 6 | ... |

SKU LEVEL INFORMATION TABLE 14b2

| SKU MANAGEMENT ID | ITEM ID | STORE ID | VARIATION ATTRIBUTE 1 | VARIATION ATTRIBUTE 2 | PRICE | QUANTITY IN STOCK | SKU IMAGE ID | SHIPPING COST | ... |
|---|---|---|---|---|---|---|---|---|---|
| 110 | 00000001 | 12345678 | COLOR: WHITE | SIZE: S | 1,300 | 56 | ITEM IMAGE 220 | FREE | ... |
| 120 | 00000001 | 12345678 | COLOR: WHITE | SIZE: M | 1,100 | 53 | ITEM IMAGE 220 | 400 | ... |
| 130 | 00000001 | 12345678 | COLOR: WHITE | SIZE: L | 1,400 | 71 | ITEM IMAGE 220 | FREE | ... |
| 140 | 00000001 | 12345678 | COLOR: BLACK | SIZE: S | 1,200 | 28 | ITEM IMAGE 230 | 300 | ... |
| 150 | 00000001 | 12345678 | COLOR: BLACK | SIZE: M | 1,250 | 52 | ITEM IMAGE 230 | FREE | ... |
| 160 | 00000001 | 12345678 | COLOR: BLACK | SIZE: L | 1,500 | 22 | ITEM IMAGE 230 | 200 | ... |

Figure 6:
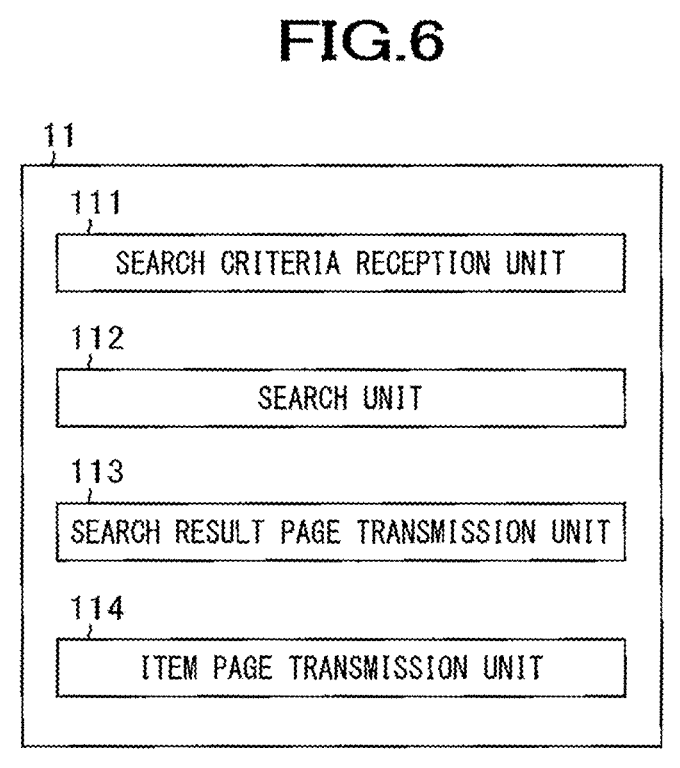

111
SEARCH CRITERIA RECEPTION UNIT

112
SEARCH UNIT

113
SEARCH RESULT PAGE TRANSMISSION UNIT

114
ITEM PAGE TRANSMISSION UNIT

FIG.7
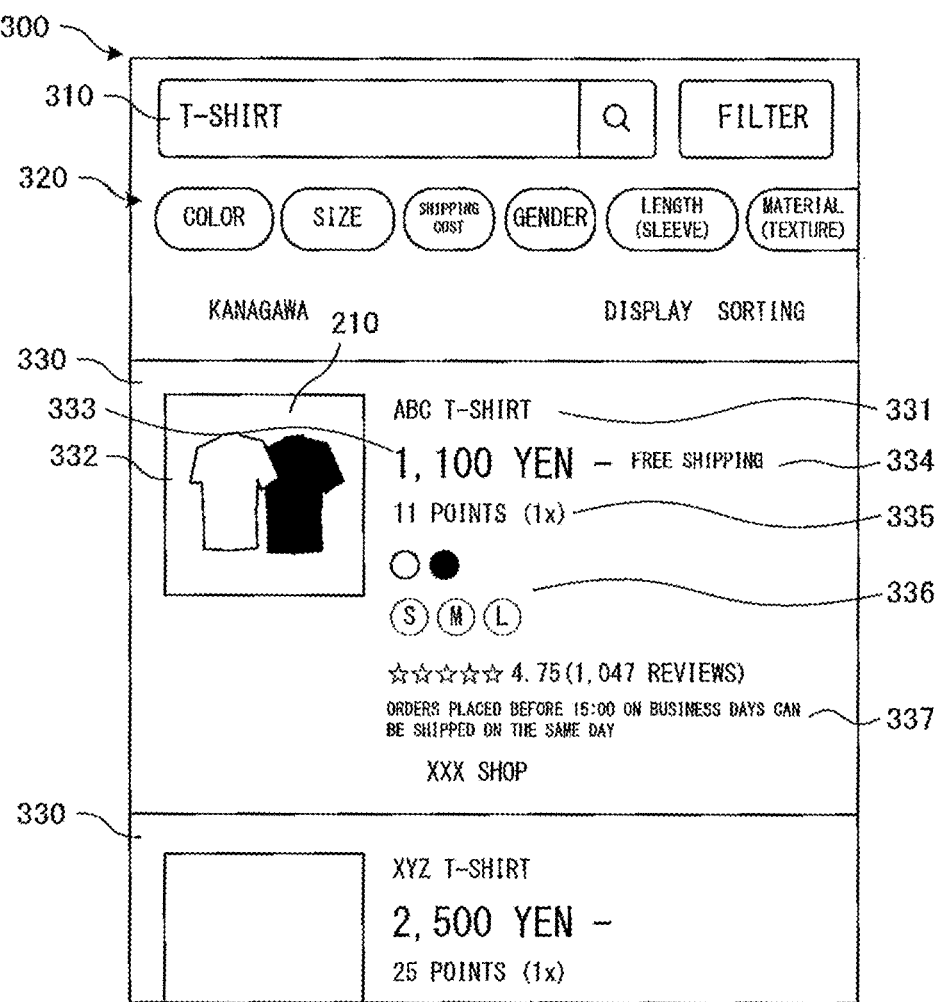
"T-SHIRT" IS ATTRIBUTE COMMON TO T-SHIRTS 110 TO 160
(ALL SKUS SATISFY SEARCH CRITERIA)
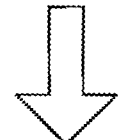
DISPLAY MULTI-SKU ITEM IMAGE 210

FIG.8
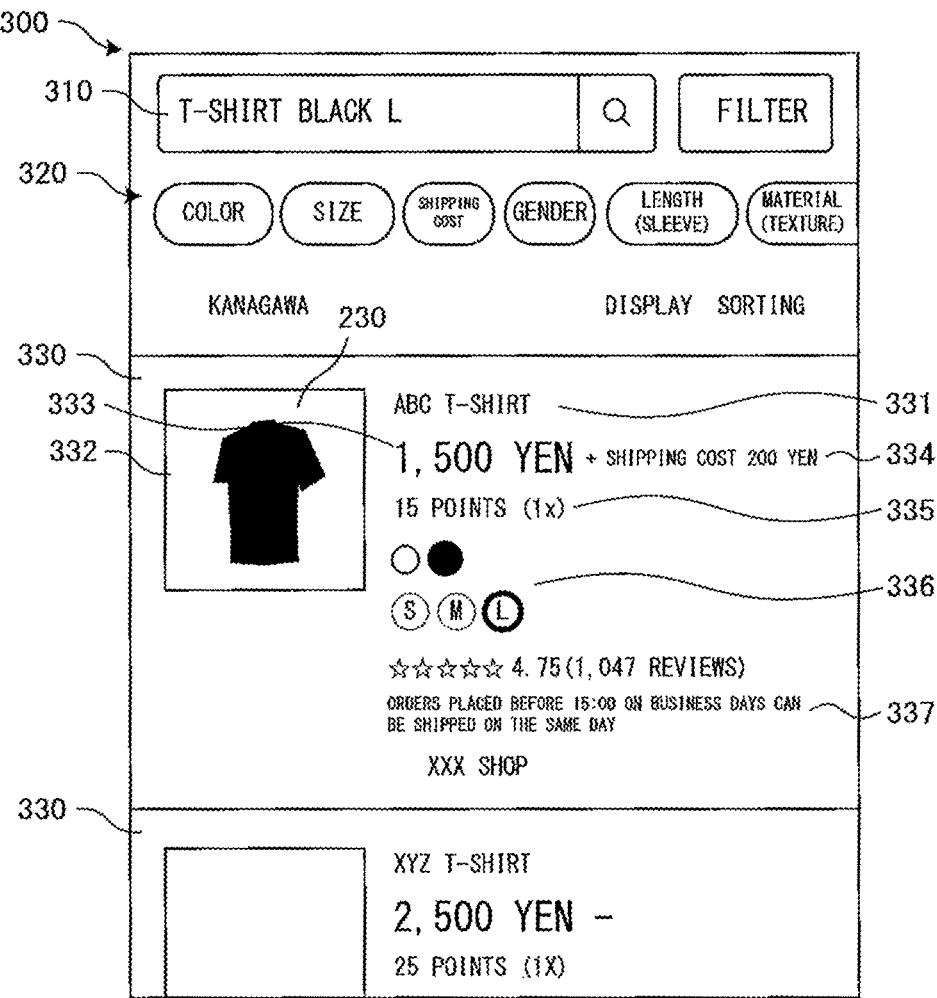
300
310 — T-SHIRT BLACK L  [🔍]  [FILTER]
320 — ( COLOR )  ( SIZE )  ( SHIPPING COST )  ( GENDER )  ( LENGTH (SLEEVE) )  ( MATERIAL (TEXTURE) )
KANAGAWA  230                    DISPLAY  SORTING
330 —
333 —
332 —
ABC T-SHIRT ———— 331
1,500 YEN + SHIPPING COST 200 YEN —— 334
15 POINTS (1x) —— 335
○ ●
Ⓢ Ⓜ Ⓛ —— 336
☆☆☆☆☆ 4.75 (1,047 REVIEWS)
ORDERS PLACED BEFORE 15:00 ON BUSINESS DAYS CAN BE SHIPPED ON THE SAME DAY —— 337
XXX SHOP
330 —
XYZ T-SHIRT
2,500 YEN –
25 POINTS (1X)
"T-SHIRT BLACK L" IS ATTRIBUTE OF ONLY T-SHIRT 160
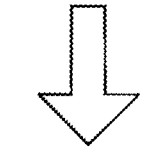
DISPLAY SKU IMAGE 230

FIG.9
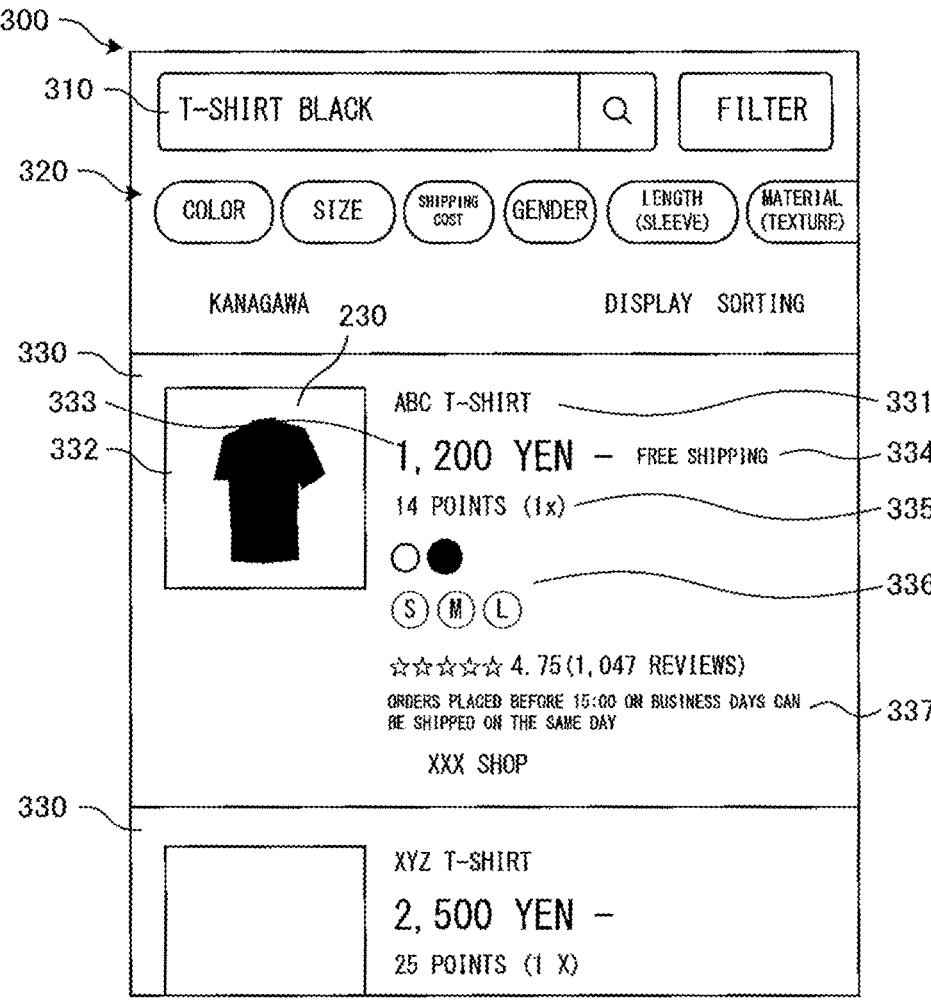
"T-SHIRT BLACK" IS ATTRIBUTE COMMON TO T-SHIRTS 140 TO 160
ITEM IMAGES (SKU IMAGE 230) ARE THE SAME
DISPLAY SKU ITEM IMAGE 230

FIG.10
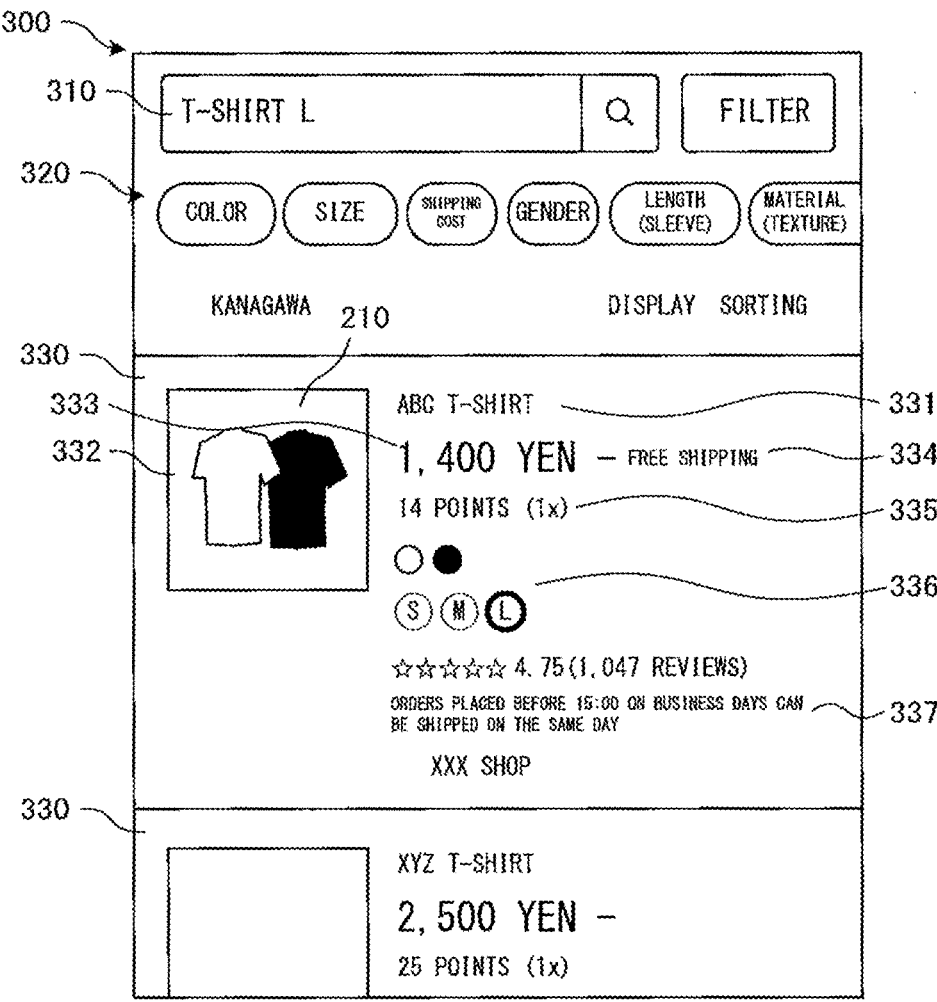
"T-SHIRT L" IS ATTRIBUTE COMMON TO T-SHIRTS 130 AND 160
ITEM IMAGES ARE DIFFERENT
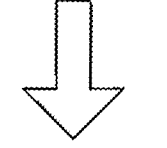
DISPLAY MULTI-SKU ITEM IMAGE 210

FIG.16

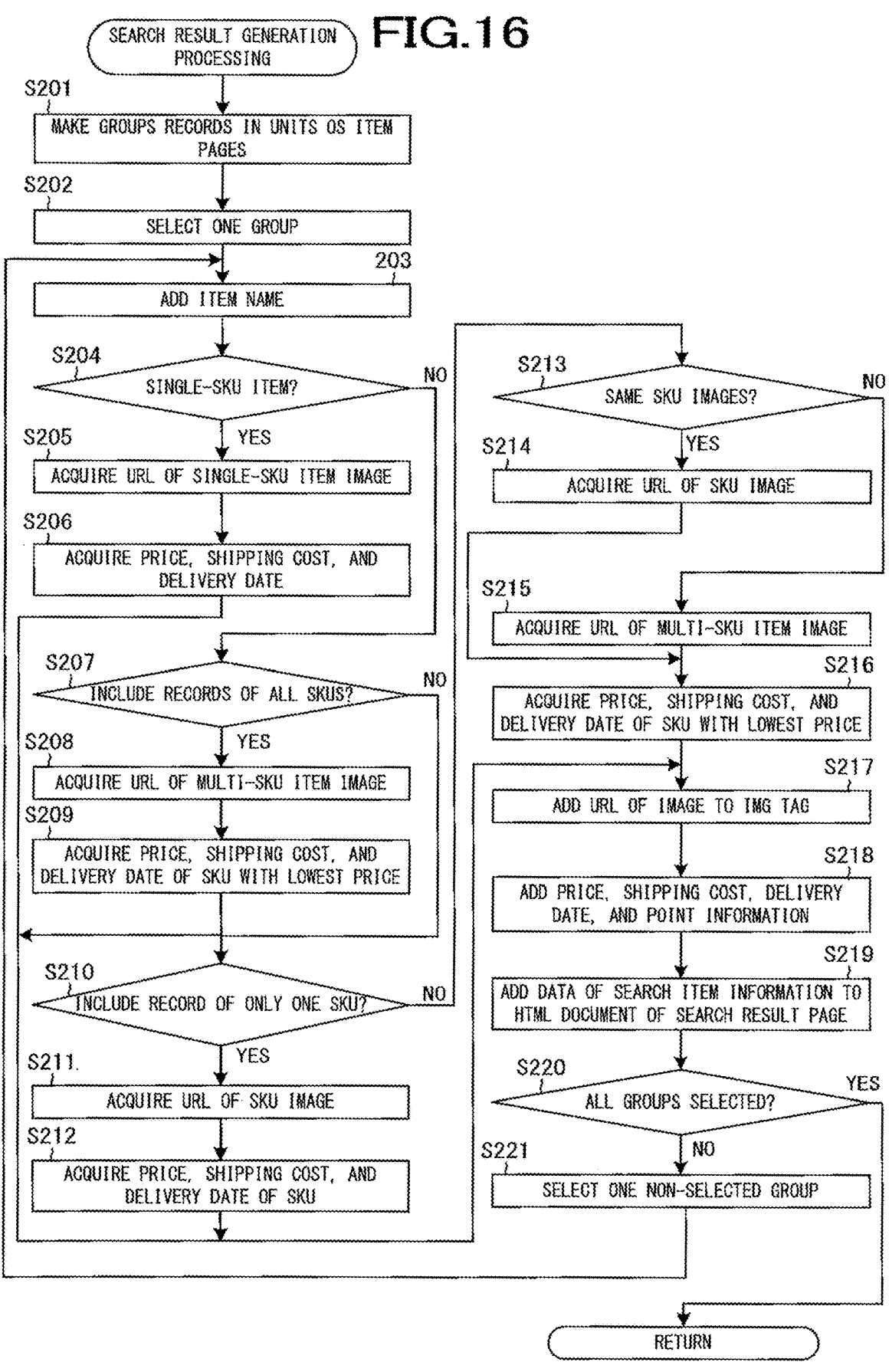

SEARCH RESULT GENERATION PROCESSING

S201 MAKE GROUPS RECORDS IN UNITS OS ITEM PAGES

S202 SELECT ONE GROUP

203 ADD ITEM NAME

S204 SINGLE-SKU ITEM? — NO

YES

S205 ACQUIRE URL OF SINGLE-SKU ITEM IMAGE

S206 ACQUIRE PRICE, SHIPPING COST, AND DELIVERY DATE

S207 INCLUDE RECORDS OF ALL SKUS? — NO

YES

S208 ACQUIRE URL OF MULTI-SKU ITEM IMAGE

S209 ACQUIRE PRICE, SHIPPING COST, AND DELIVERY DATE OF SKU WITH LOWEST PRICE

S210 INCLUDE RECORD OF ONLY ONE SKU? — NO

YES

S211 ACQUIRE URL OF SKU IMAGE

S212 ACQUIRE PRICE, SHIPPING COST, AND DELIVERY DATE OF SKU

S213 SAME SKU IMAGES? — NO

YES

S214 ACQUIRE URL OF SKU IMAGE

S215 ACQUIRE URL OF MULTI-SKU ITEM IMAGE

S216 ACQUIRE PRICE, SHIPPING COST, AND DELIVERY DATE OF SKU WITH LOWEST PRICE

S217 ADD URL OF IMAGE TO IMG TAG

S218 ADD PRICE, SHIPPING COST, DELIVERY DATE, AND POINT INFORMATION

S219 ADD DATA OF SEARCH ITEM INFORMATION TO HTML DOCUMENT OF SEARCH RESULT PAGE

S220 ALL GROUPS SELECTED? — YES

NO

S221 SELECT ONE NON-SELECTED GROUP

RETURN

SEARCH RESULT PAGE TRANSMISSION DEVICE, SEARCH RESULT PAGE TRANSMISSION METHOD, AND SEARCH RESULT PAGE TRANSMISSION PROGRAM

CROSS REFERENCE TO RELATED PATENT APPLICATION

This application claims priority from Japanese Patent Application No. 2022-176738 filed Nov. 2, 2022, the entire disclosure of which, including the specification, the scope of claims, drawings, and abstract, is incorporated herein by reference in their entirety.

BACKGROUND

Technical Field

The present invention relates to the technical field of a method of searching for items based on specified search criteria and providing a web page indicating results of the search.

Related Art

Conventionally, items are actively sold and bought through e-commerce using a network such as the Internet. In such an e-commerce website, it is common that a user can specify criteria of a desired item as search criteria. An e-commerce website searches for items that satisfy specified search criteria and transmits a web page (hereinafter, the page is referred to as a "search result page") that shows results of the search to a terminal device of the user. In the search result page, for example, an item name, an image, a price, and the like of each found item are displayed. When the user selects one of the found items from the search result page, the e-commerce website transmits a web page (hereinafter, the page is referred to as an "item page") that carries information on the selected item to the terminal device. Normally, the item page allows the user to perform an operation to choose an item whose information is shown on the item page as a purchase target. For example, a button or other element for putting the item in the shopping cart may be displayed on the item page, or a button or other element for directly proceeding to the purchase procedure of the item may be displayed. The user can purchase an item through the item page. In this respect, it may be said that the item page has a role as a sales floor.

In one item page, information on only one item is displayed, and in many cases, only the one item is selectable as a purchase target. On the other hand, information on a plurality of items may be displayed on one item page, and the user may be able to select an item to be purchased from among the items. That is, a plurality of items may have a common item page as the sales floor. For example, while most attributes are common to a plurality of items, information on the plurality of items having some attributes different from each other may be posted on one item page. Stocks of a plurality of respective items having a common item page is often managed separately. Therefore, one item page may correspond to items of a plurality of SKUs (Stock Keeping Units). The SKU indicates a unit for managing a stock of items or a unit for storing a stock. One example of such items is clothing that has variations in color and size combinations. In the item page, information common to the plurality of items is displayed, and individual information is displayed for each item. For example, an item name common to the plurality of items or an image in which the items are captured at a time may be displayed on the item page. In addition, an image in which each item is individually captured or an attribute of each item may be displayed on the item page. In the search result page described above, item search results are generally displayed for each item page. For items having a common item page, information designated in advance as main information by a seller of the items among the pieces of information shown in the item page is displayed on the search result page. For example, the seller may designate an image in which a plurality of items is captured at a time or an image in which only one item is captured as the image to be displayed on the search result page.

In relation to the above points, WO 2016/084230 A discloses a server device that generates and deletes a tag used for item search on the basis of information of an item page of items having variations in combinations of attributes. The server device extracts a plurality of combinations of attributes of items from the source information of the item page, and determines whether an item having each combination of attributes is in stock or out of stock. For a combination of attributes in stock, the server device associates a tag with an item ID for identifying an item and stores the tag in the tag database. On the other hand, for a combination of attributes that is out of stock, the server device deletes a tag stored in the tag database in association with the item ID. In a case where any one of a plurality of tags stored in the tag database for each item corresponds to search criteria at the time of searching for items, the server device includes the item in search results.

There are various criteria on the item specified by the user as the search criteria. For example, it is assumed that a user wants a T-shirt whose color is black and whose size is L. In this case, the user may input search criteria of "T-shirt black L", for example. In this case, when information designated in advance for the found item is displayed on the search result page, the user may not be able to immediately determine whether or not the desired item has been found. For example, assume that T-shirts in which white and black are present as color variations and S, M, and L are present as size variations are sold on one item page. In this case, one item page corresponds to a maximum of six items. It is assumed that a seller of this T-shirt designates an image in which a white T-shirt and a black T-shirt are simultaneously captured or an image in which only the white T-shirt is captured as an image to be displayed on the search result page. In this case, the displayed content on a search result is inconsistent with the search criteria specified by the user.

In order to avoid such a problem, it is conceivable to set a restriction on registration of information on items so that one item page corresponds to only one item. By doing so, for example, images included in the search results of the T-shirt whose color is black and whose size is L is likely to be images of black T-shirts. However, in this case, the number of search results displayed on the search result page may become unnecessarily large. For example, it is assumed that another user wants a T-shirt although the user does not determine the color or the size of it. In this case, the user may enter search criteria of "T-shirt", for example. In this case, six search results are displayed as search results on the T-shirt having the variations described above.

SUMMARY

The present invention has been made in view of the above points, and an example of the object thereof is to provide a search result page transmission device, a search result page transmission method, and a search result page transmission program capable of providing information related to search criteria as search results in unit of web pages for pluralities of items, each of which share a web page configured to accept a user operation to select an item as a purchase target.

An aspect of the present invention is a search result page transmission device comprising: at least one memory configured to store computer program code; at least one processor configured to access the memory and operate as instructed by the computer program code, the computer program code including; reception code configured to cause at least one of the at least one processor to receive search criteria information indicating search criteria for a search for items from a terminal device; search code configured to cause at least one of the at least one processor to search a storage for at least one of common attribute information indicating a common attribute satisfying the search criteria indicated by the received search criteria information and individual attribute information indicating an individual attribute satisfying the search criteria indicated by the received search criteria information, the storage being configured to store thereon, for each of a plurality of item web pages, the common attribute information indicating the common attribute shared by a plurality of items corresponding to a respective item web page among the plurality of item web pages and the individual attribute information indicating the individual attribute possessed by each of the plurality of items corresponding to the respective item web page in addition to the common attribute, the respective item web page being configured to accept a user operation to select an item as a purchase target from the plurality of items corresponding to the respective item web page, the stored common attribute information and the stored individual attribute information being associated with web page information indicating the respective item web page; and transmission code configured to cause at least one of the at least one processor to transmit a search result web page to the terminal device, the search result web page indicating results of the search for items in units of item web pages, wherein, in response to the common attribute satisfying the search criteria and the search criteria not including criteria corresponding to individual attributes of the plurality of items, the transmission code is further configured to cause at least one of the at least one processor to include first item information common to the plurality of items in the search result web page to be transmitted, and wherein, in response to an individual attribute of at least one item of the plurality of items satisfying the search criteria, the transmission code is further configured to cause at least one of the at least one processor to include second item information on the at least one item in the search result web page to be transmitted.

Another aspect of the present invention is a search result page transmission method performable by a computer, the method comprising: receiving search criteria information indicating search criteria for a search for items from a terminal device; searching a storage for at least one of common attribute information indicating a common attribute satisfying the search criteria indicated by the received search criteria information and individual attribute information indicating an individual attribute satisfying the search criteria indicated by the received search criteria information, the storage being configured to store thereon, for each of a plurality of item web pages, the common attribute information indicating the common attribute shared by a plurality of items corresponding to a respective item web page among the plurality of item web pages and the individual attribute information indicating the individual attribute possessed by each of the plurality of items corresponding to the respective item web page in addition to the common attribute, the respective item web page being configured to accept a user operation to select an item as a purchase target from the plurality of items corresponding to the respective item web page, the stored common attribute information and the stored individual attribute information being associated with web page information indicating the respective item web page; and transmitting a search result web page to the terminal device, the search result web page indicating results of the search for items in units of item web pages, wherein, in response to the common attribute satisfying the search criteria and the search criteria not including criteria corresponding to individual attributes of the plurality of items, the transmitting further includes including first item information common to the plurality of items in the search result web page to be transmitted, and wherein, in response to an individual attribute of at least one item of the plurality of items satisfying the search criteria, the transmitting further includes including second item information on the at least one item in the search result web page to be transmitted.

Yet another aspect of the present invention is a non-transitory computer readable medium storing thereon a search result page transmission program causing a computer to: receive search criteria information indicating search criteria for a search for items from a terminal device; search a storage for at least one of common attribute information indicating a common attribute satisfying the search criteria indicated by the received search criteria information and individual attribute information indicating an individual attribute satisfying the search criteria indicated by the received search criteria information, the storage being configured to store thereon, for each of a plurality of item web pages, the common attribute information indicating the common attribute shared by a plurality of items corresponding to a respective item web page among the plurality of item web pages and the individual attribute information indicating the individual attribute possessed by each of the plurality of items corresponding to the respective item web page in addition to the common attribute, the respective item web page being configured to accept a user operation to select an item as a purchase target from the plurality of items corresponding to the respective item web page, the stored common attribute information and the stored individual attribute information being associated with web page information indicating the respective item web page; and transmit a search result web page to the terminal device, the search result web page indicating results of the search for items in units of item web pages, wherein, in response to the common attribute satisfying the search criteria and the search criteria not including criteria corresponding to individual attributes of the plurality of items, the transmitting further includes including first item information common to the plurality of items in the search result web page to be transmitted, and wherein, in response to an individual attribute of at least one item of the plurality of items satisfying the search criteria, the transmitting further includes including second item information on the at least one item in the search result web page to be transmitted.

BRIEF DESCRIPTION OF DRAWINGS

FIG. 2 is a block diagram illustrating an example of a schematic configuration of an online shopping mall server according to an embodiment.

FIG. 3 is a diagram illustrating an example of information stored in databases of the online shopping mall server.

FIG. 5 is a diagram illustrating an example of information stored in an item page level information table and a SKU level information table.

FIG. 6 is a diagram illustrating an example of functional blocks of a system controller in the online shopping mall server according to the embodiment.

FIG. 7 is a diagram illustrating an example of a search result page.

FIG. 8 is a diagram illustrating an example of a search result page.

FIG. 9 is a diagram illustrating an example of a search result page.

FIG. 10 is a diagram illustrating an example of a search result page.

FIG. 16 is a flowchart illustrating an example of search result generation processing executed by the system controller of the online shopping mall server.

DETAILED DESCRIPTION

Hereinafter, embodiments of the present invention will be described in detail with reference to the drawings. In the embodiment described below, the present invention is applied to an online shopping mall for a plurality of businesses to sell items. However, the present invention may be applied to an online shopping site where only a single business sells items.

[1. Configuration of Shopping System]

Figure 1:
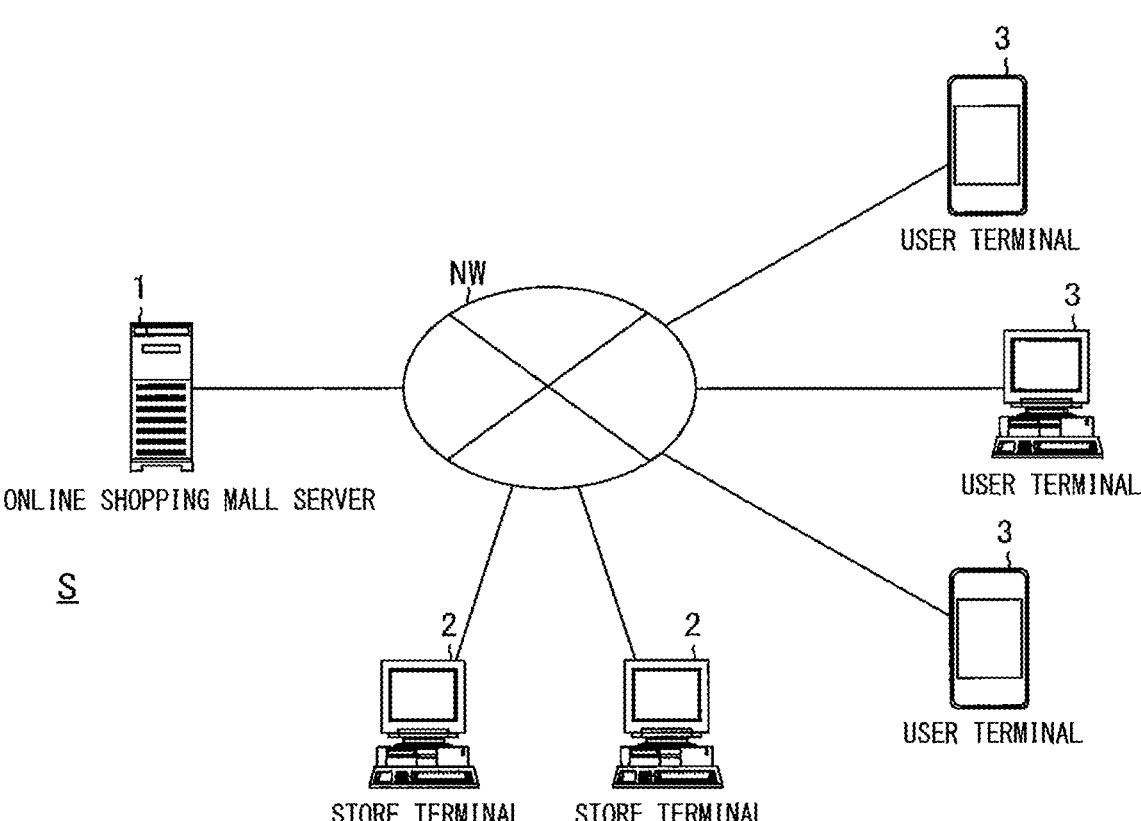
FIG. 1 is a diagram illustrating an example of a schematic configuration of a shopping system according to an embodiment.

First, a configuration and a functional outline of a shopping system S according to the present embodiment will be described with reference to FIG. 1. FIG. 1 is a diagram illustrating an example of a schematic configuration of the shopping system S according to the present embodiment.

As illustrated in FIG. 1, the shopping system S includes an online shopping mall server 1, a plurality of store terminals 2, and a plurality of user terminals 3. The online shopping mall server 1, the store terminals 2, and the user terminals 3 are connected to each other via a network NW. The network NW is constructed by, for example, the Internet, a dedicated communication line (for example, a CATV (Community Antenna Television) line), a mobile communication network (including a base station and the like), a gateway, and the like.

The online shopping mall server 1 is a server device that manages a predetermined online shopping mall. The online shopping mall is a website for a plurality of stores to sell items. In this online shopping mall, it may be possible to trade items on a stock keeping unit (SKU) basis. That is, information on a stock of each item may be individually managed. In the present embodiment, when it is emphasized that information on an item corresponding to a stock keeping unit is managed by a store side, the item may be simply referred to as a SKU.

The online shopping mall server 1 transmits various types of web pages included in the online shopping mall to the user terminals 3. One such web page is an item page. The item page is a web page that shows information on a specific item. Furthermore, the item page is a web page configured to accept a user operation to select the specific item as a purchase target. For example, an operable element such as a button, an icon, or a menu is displayed in the item page or above the item page. The user can choose the item as the purchase target by operating this element. Examples of choosing the item as the purchase target includes putting the item in a shopping cart. The shopping cart is a virtual container in which items chosen as purchase targets by the user is put. After putting the item in the shopping cart, the user performs an operation to proceed to a purchase procedure. As a result, the user can purchase the item in the shopping cart. The examples of choosing the item as the purchase target further includes directly proceeding to the purchase procedure of the item without using the shopping cart.

The online shopping mall server 1 enables a single item (one SKU) to be sold through a single item page, and also enables a plurality of items (a plurality of SKUs) to be sold through another single item page. When a single SKU is set to be purchasable on a single item page, the item is referred to as a single-SKU item. A way of sales in which a single item page is associated with a single-SKU item is a common way of sales. When registering information about a single-SKU item, the store inputs information about the single SKU together with the information about the item page. When a plurality of SKUs are set to be purchasable on a single item page, an item group including this plurality of SKUs is referred to as a multi-SKU item. The plurality of SKUs included in the multi-SKU item have attributes common to each other. This attribute is referred to as a common attribute. Examples of the common attribute include an item name, a category of the item (genre), and a description of the item. Apart from the common attributes mentioned afore, each SKU included in the multi-SKU item also has at least one individual attribute. This attribute is referred to as a SKU attribute or the individual attribute. The SKU attributes include a variation attribute and other attributes. Variation attributes of SKUs of the multi-SKU item may be different to each other. When a combination of a plurality of variation attributes is set for each SKU, combinations of variation attributes of SKUs in the multi-SKU item may be different to each other. For example, it is assumed that an item of a T-shirt having variations in combinations of color and size is sold on a single item page. In this case, each of the color and the size may be a variation attribute. On the item page of a multi-SKU item, the user may select a variation attribute or a combination of variation attributes. This selection allows the user to select any SKU among the plurality of SKUs included in the multi-SKU item. The SKU attribute other than the variation attribute is set for each SKU, but attributes other than variation attributes of SKUs in the multi-SKU item are not necessarily different to each other. For example, the price of each SKU is an example of a SKU attribute other than the variation attribute. A multi-SKU item may be considered an item with variations on some attributes. When registering information on the multi-SKU item, a store inputs information on each SKU together with information on the item page and information common to the plurality of SKUs. An operator of the online shopping mall may determine in advance what attributes are the common attributes and what attributes are the SKU attributes. For example, in the present embodiment, the item name is the common attribute, but the item name may be the SKU attribute.

Web pages of the online shopping mall also include search result pages. The search result page is a web page on which a list of found items is shown as results of search for items. For example, on a home page of the online shopping mall or other web pages, the user can input search criteria on an item. Examples of the search criteria include keywords, item categories, item attributes, and the like. Upon receiving the input search criteria from the user terminal 3, the online shopping mall server 1 searches for item s satisfying the search criteria. At this time, the online shopping mall server 1 may search for items in units of SKUs. For example, the online shopping mall server 1 may search for SKUs of which at least one of the common attribute and the SKU attribute satisfies the search criteria. After searching for the items, the online shopping mall server 1 generates a search result page and transmits the search result page to the user terminal 3. The online shopping mall server 1 may generate a search result page so as to indicate search results in units of item web pages. For example, even when two or more SKUs among the plurality of SKUs included in the multi-SKU item satisfy the search criteria, the online shopping mall server 1 may generate only one search result for the multi-SKU item.

Each store terminal 2 is a terminal device used by an employee or the like of a store opened in an online shopping mall. Examples of the store terminal 2 include a personal computer and a tablet computer. By operating the store terminal 2 to access the online shopping mall server 1, the employee or the like registers an item in the online shopping mall, checks order reception information from a customer, or checks information related to sales, for example. A web browser may be installed in each store terminal 2.

Each user terminal 3 is a terminal device used by a user who uses the online shopping mall. Examples of the user terminal 3 include a portable information terminal such as a smartphone or a tablet computer, a mobile phone, a PDA (Personal Digital Assistant), a personal computer, a set top box, and the like. The user terminal 3 transmits a request to the online shopping mall server 1 based on a user's operation, and displays a web page transmitted from the online shopping mall server 1 in response to the request. A web browser may be installed in each user terminal 3. In a case where the user terminal 3 is a portable terminal device, an application dedicated to the online shopping mall may be installed in the user terminal 3. In this case, the user terminal 3 displays the web page of the online shopping mall according to the application.

[2. Configuration of Online Shopping Mall Server]

Figure 2:
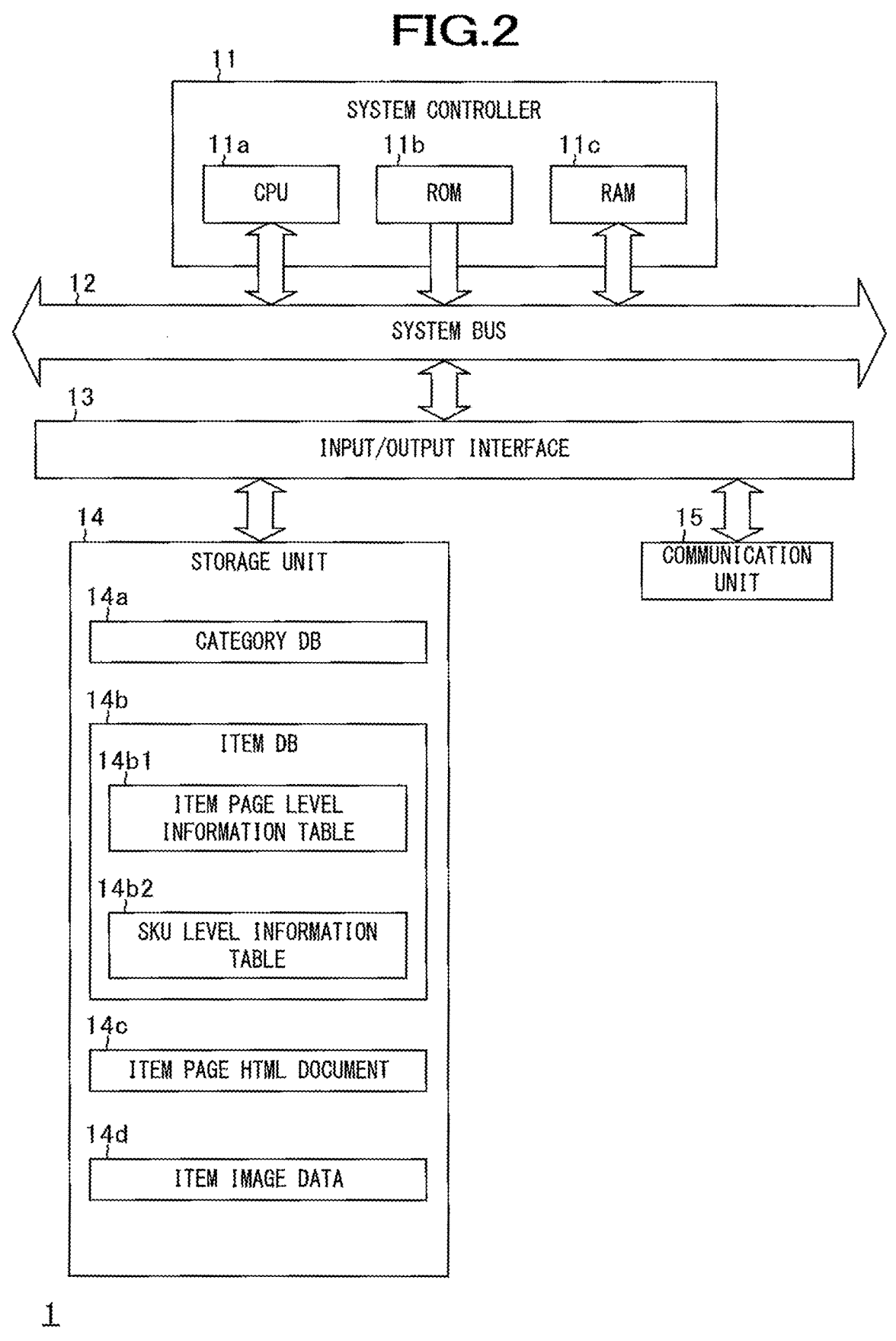

Next, a configuration of the online shopping mall server 1 will be described with reference to FIGS. 2 to 5. FIG. 2 is a block diagram illustrating an example of a schematic configuration of the online shopping mall server 1 according to the present embodiment. As illustrated in FIG. 2, the online shopping mall server 1 includes a system controller 11, a system bus 12, an input/output interface 13, a storage unit 14, and a communication unit 15. The system controller 11 and the input/output interface 13 are connected via the system bus 12.

The system controller 11 includes a central processing unit (CPU) 11a, a read only memory (ROM) 11b, a random access memory (RAM) 11c, and the like.

The input/output interface 13 performs interface processing between the storage unit 14 and the communication unit 15, and the system controller 11.

The storage unit 14 includes, for example, a hard disk drive or the like. The storage unit 14 stores databases including a category DB 14a, an item DB 14b and the like. "DB" is an abbreviation for database. FIG. 3 is a diagram illustrating an example of information stored in databases of the online shopping mall server 1.

In the category DB 14a, category definition information related to a category of an item is stored for each category. For example, the category DB 14a may store, as the category definition information, a category ID, a category name, a level of a category, a parent category ID, a child category ID list, category attribute definition information, and the like in association with each other. The category definition information may be set by, for example, an administrator of the online shopping mall.

The categories of the items are hierarchically defined a tree structure. For example, each node of the tree structure corresponds to a category. The depth of the node corresponds to the level (layer) of the category corresponding to the node. The depth of a node is a distance from a root node located at a root in the tree structure. The greater the value of the level, the deeper the depth of that node. A category corresponding to a child node of the root node is a category of level 1. The category of level 1 is the highest category. A category corresponding to a child node of the category of level 1 is a category of level 2. A category corresponding to a child node of a category of interest is referred to as a child category. A category corresponding to the descendant node of the category of interest is referred to as a descendant category. A category corresponding to a parent node of a category of interest is referred to as a parent category. A category corresponding to the ancestor node of the category of interest is referred to as an ancestor category. Each category includes descendant categories of that category. Examples of the category of level 1 include fashion, food and drink, daily necessities, home appliances, and sports. Child categories of the fashion include women's fashion, men's fashion, children's baby fashion, underwear, bags, shoes, and the like. Examples of child categories of women's fashion include tops, bottoms, a coat/jacket, and a dress. Examples of the child category of the tops include a T-shirt, a shirt, a knit, and a cardigan.

In the category definition information, the category ID is identification information for identifying a category. The category name indicates a name of the category. The level indicates a layer of the category. The parent category ID is a category ID of a parent category of the category. The child category ID list indicates a list of category IDs of child categories of the category. The category definition information for the lowest category may not include the child category ID list. The category attribute definition information is information that defines what attributes items belonging to the category have. The attributes defined by the category attribute definition information may be SKU attributes. The category attribute definition information is stored for each attribute classification. A plurality of pieces of category attribute definition information may be stored for one category. Examples of the attribute classification in a case where the category is tops for clothes include a color, a size, a brand, a sleeve length, a material type, a pattern, and the like. Examples of attribute classification in a case where the category is drinking water include a capacity, the number of bottles, a brand, a production area, and the like. Examples of the attribute classification in a case where the category is a personal computer include a color, a manufacturer, a memory capacity, a screen size, a disk capacity, and the like. The category attribute definition information may include, for example, an attribute classification name and attribute value information. The attribute classification name indicates the name of the attribute classification. The attribute value information is information defining an attribute value that the item may have in the attribute classification indicated by the attribute classification name. For example, a plurality of attribute values that the item may have may be listed in the attribute value information. For example, in a case where the attribute classification is color, "white", "black", "red", "blue", and the like may be listed as the attribute value word. When the attribute value is represented by a numerical value, a character indicating a unit may be listed in the attribute value information. For example, when the attribute classification is memory capacity, characters such as "gigabyte" and "GB" may be listed. The category attribute definition information may be stored in the category DB 14a only for the lowest category. Alternatively, the category attribute definition information may also be stored for categories other than the lowest category. In this case, all the descendant categories of the category of interest may be interpreted as having inherited the category attribute definition information on the category of interest.

The item DB 14b stores item information on items to be sold by each store in the online shopping mall. The item DB 14b may include, for example, an item page level information table 14b1 and a SKU level information table 14b2.

In the item page level information table 14b1, item page level information is stored for each item page, in association with web page information indicating an item page. The item page level information includes information about a single-SKU item or a multi-SKU item, rather than information about each SKU. The item page level information may include information displayed on the item page in any case. The item page level information for a multi-SKU item may include the common attributes described above. For example, in the item page level information table 14b1, as the item page level information, an item ID, a store ID, category information, an item name, an item description, a point rate, an item image ID, an item page URL (Uniform Resource Locator), the number of SKUs, variation attribute definition information, and the like may be stored in association with each other. The item ID is identification information assigned to an item by a store in order to identify the item. The store ID is identification information for identifying the store that sells the item. With the combination of the item ID and the store ID, any item sold by any store is identified in the online shopping mall. The category information indicates a category of the item. For example, the category information may include a list of category IDs of all levels from the highest level to the lowest level in which the item is classified. The item name indicates a name of the item. The item description is a document indicating a description of the item. The point rate indicates how many percentage points are granted to a purchaser of the item with respect to the price of the item. This point is managed in a predetermined points program. The user can use the granted points for purchase of an item or a service. For example, one point may correspond to one yen. The item name, item description, and point rate for a multi-SKU item are information common to a plurality of SKUs included in the multi-SKU item. The item image ID is identification information for identifying an item image related to an item. Examples of the item image ID include a URL, a file name, and a path name of the item image. A plurality of item image IDs may be stored for one piece of item page level information. For a single-SKU item, an item image identified by an item image ID included in the item page level information is referred to as a single-SKU item image. For a multi-SKU item, an item image identified by an item image ID included in the item page level information is referred to as a multi-SKU item image. The multi-SKU item image may be an image related to any of a plurality of SKUs included in the multi-SKU item or an image including information common to the SKUs. For example, the multi-SKU item image may be an image in which a plurality of SKUs are simultaneously captured. The item page URL is a URL of a HTML (Hyper Text Markup Language) document of the item page. The item page URL may be generated from a combination of the item ID and the store ID. For example, the item page URL may be generated by adding the item ID and the store ID to a predetermined URL. The number of SKUs indicates the number of SKUs included in the item. If the item is a single-SKU item, the number of SKUs indicates 1. If the item is a multi-SKU item, the number of SKUs indicates two or more. The variation attribute definition information is information indicating what variation attribute each SKU included in the item may have when the item is a multi-SKU item. The variation attribute definition information may be stored for each classification of the variation attribute. Each piece of variation attribute definition information may include, for example, an attribute classification name and attribute value information. The attribute classification name indicates a name of the classification of the variation attribute. The attribute value information is information that lists attribute values, each of which is possessed by at least one of a plurality of SKUs included in the multi-SKU item in the attribute classification indicated by the attribute classification name. For example, for clothing having variations of red, blue, and white as colors, the attribute classification name may be set to "color", and the attribute value information may be set to attribute values including "red", "blue", and "white" and the like. For example, for drinking water having variations of 350 milliliters and 500 milliliters in volume, the attribute classification name may be set to "volume", and the attribute value information may be set to "350" and "500" as the attribute values and "ml" as the unit. The web page information associated with the item page level information may be, for example, an HTML document of an item page, an item page URL, or a combination of an item ID and a store ID. The combination of the item ID and the store ID corresponds to the item page on a one-to-one basis. Therefore, the combination of the item ID and the store ID may correspond to information indicating the item page.

In the SKU level information table 14b2, SKU level information is stored for each SKU as item information on each SKU. The SKU level information may include a SKU attribute. For example, the SKU level information table 14b2 may store, as the SKU level information, a SKU management ID, an item ID, a store ID, a product code, variation attribute information, a price, the quantity in stock, a shipping cost, a delivery date, other attribute information, and the like in association with each other. The SKU management ID is identification information for identifying a SKU in a single-SKU item or a multi-SKU item. The item ID indicates an item corresponding to the SKU. The store ID indicates a store that sells the SKU. With a combination of the item ID and the store ID, the SKU level information is associated with the web page information. The product code is information for uniquely identifying the item of the SKU. An example of the product code is a JAN (Japanese Article Number) code. The variation attribute information indicates a variation attribute of the SKU. The variation attribute information is set within a range of attributes indicated in the variation attribute definition information included in the item page level information corresponding to the combination of the item ID and the store ID. For example, the variation attribute information may include an attribute classification name and an attribute value. All of the price, the quantity in stock, the shipping cost, and the delivery date are SKU attributes. The other attribute information also indicates the SKU attribute. For example, the attribute information on the classification indicated by the category attribute definition information stored in the category DB 14a for the category indicated by the category ID included in the item page level information may be set as the other attribute information. An attribute classification name and an attribute value may be stored as the other attributes. The SKU image ID is identification information for identifying the item image related to the SKU. The item image related to the SKU is referred to as a SKU image. Examples of the SKU image ID include a URL, a file name, and a path name of the SKU image. A plurality of SKU image IDs may be stored for one piece of SKU level information. The image of each SKU included in the multi-SKU item may be an image associated with that SKU. For example, the SKU image may be an image in which only one SKU is captured among the SKUs included in the multi-SKU item.

In the present embodiment, the item page level information and each piece of SKU level information are separately stored in the item DB 14b. With the combination of the item ID and the store ID included in the SKU level information and the combination of the item ID and the store ID included in the item page level information, the SKU level information is associated with the item page level information. However, each piece of SKU level information may include information corresponding to the item page level information.

The storage unit 14 further stores an item page HTML document 14c and item image data 14d. The item page HTML document 14c is an HTML document of the item page. The item image data 14d is data of an item image. Examples of the format of the image data include JPEG, TIFF, GIF, and the like. When item information on an item is stored in the item DB 14b, the online shopping mall server 1 may generate an HTML document of an item page on the basis of the stored information.

Each store can register item information through a web page transmitted from the online shopping mall server 1 to the store terminal 2. For example, an employee of a store inputs an item ID, an item name, a lowest category, an item description, and the like to the store terminal 2. The online shopping mall server 1 may receive the input information from the store terminal 2, and store the item page level information including the received information and the store ID of the store in the item DB 14b. At this time, the online shopping mall server 1 may store, as the category information, the category ID of the ancestor categories of the input category together with the category ID of the category. The employee uploads the image data of the single-SKU item image or the multi-SKU item image to the online shopping mall server 1. The online shopping mall server 1 may assign an item image ID to the uploaded image data, and store the image data in the storage unit 14 as the item image data 14d in association with the item image ID. Further, the online shopping mall server 1 may add the assigned item image ID to the item page level information stored in the item DB 14b. The employee can also select the item to be registered from a single-SKU item and a multi-SKU item. When the multi-SKU item is selected, the employee inputs the variation attribute definition information. The online shopping mall server 1 may be configured such that the attribute classification and the attribute value of the variation attribute definition information can be selected from the list on the basis of the category attribute definition information stored in the item DB 14b for the category of the item to be registered. Alternatively, the employee may manually input the attribute classification and the attribute value. The online shopping mall server 1 may receive the input variation attribute definition information from the store terminal 2 and add the variation attribute definition information to the item page level information stored in the item DB 14b. The employee then enters SKU level information. If a multi-SKU item is selected, the employee enters level information for each SKU. When only one piece of variation attribute definition information is registered, SKU level information can be input for each variation attribute. When a plurality of pieces of variation attribute definition information is registered, SKU level information can be input for each combination of variation attributes. Here, a combination of unnecessary variation attributes may be deleted. The employee inputs the product code, the price, the quantity in stock, the shipping cost, the delivery date, other attributes, and the like as the SKU level information. The online shopping mall server 1 may receive the input information from the store terminal 2, and store the SKU level information including the received information, the combination of the item ID and the store ID corresponding to the information, and the variation attribute information corresponding to the information in the item DB 14b. At this time, the online shopping mall server 1 may automatically assign the SKU management number. Further, the employee uploads the image data of the SKU image to the online shopping mall server 1 for each SKU. The online shopping mall server 1 may assign a SKU image ID to the uploaded image data, and store the image data in the storage unit 14 as the item image data 14d in association with the item image ID. The online shopping mall server 1 may add the assigned SKU image ID to the SKU level information corresponding to the SKU image among the pieces of SKU level information stored in the item DB 14b. In the multi-SKU item, information other than the variation attribute information and the SKU management ID may be collectively input for two or more SKUs or all the SKUs included in the multi-SKU item. In this case, information common to two or more SKUs or all SKUs is registered. If the information input collectively for all SKUs is a SKU attribute, the attribute may be considered to be substantially a common attribute.

Figure 4:
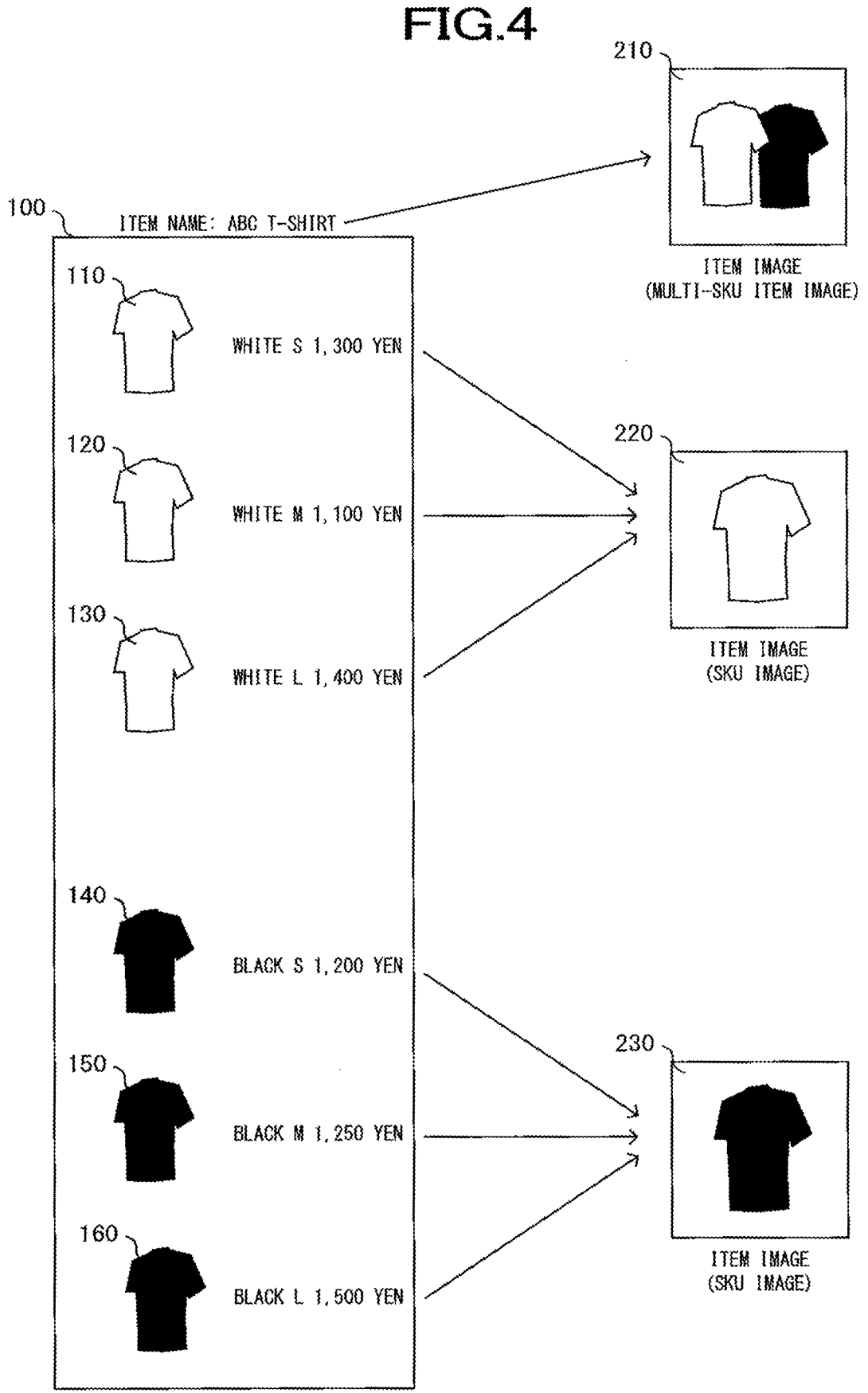
FIG. 4 is a diagram illustrating an example of an outline of a multi-SKU item.

Hereinafter, a specific registration example of the item information will be described. FIG. 4 is a diagram illustrating an example of an outline of a multi-SKU item. The multi-SKU item shown in FIG. 4 is a T-shirt 100 with the item name "ABC T-shirt" belonging to the category of T-shirts. This T-shirt 100 has variations in color and size. For example, the colors include white and black. The sizes include S, M, and L. The SKUs included in the T-shirt 100 include T-shirts 110, 120, 130, 140, 150, and 160. The T-shirts 110 to 160 may have the same brand and model number, for example. The color of each of T-shirts 110, 120, and 130 is white. The color of each of the T-shirts 140, 150, and 160 is black. The size of each of the T-shirts 110 and 140 is S. The size of each of the T-shirts 120 and 150 is M. The size of each of the T-shirts 130 and 160 is L. The prices of the T-shirts 110, 120, 130, 140, 150, and 160 are 1300 yen, 1100 yen, 1400 yen, 1200 yen, 1250 yen, and 1500 yen, respectively. Other SKU attributes are also set individually. A multi-SKU item image 210 is registered as the multi-SKU item image of the T-shirt 100. The multi-SKU item image 210 is an image showing a white T-shirt and a black T-shirt simultaneously. A SKU image 220 is registered as the SKU image of each of the T-shirts 110, 120, and 130. The SKU image 220 is an image in which only a white T-shirt is captured. The SKU image 230 is registered as the SKU image of each of the T-shirts 140, 150, and 160. The SKU image 230 is an image in which only a black T-shirt is captured.

FIG. 5 is a diagram illustrating an example of information stored in the item page level information table 14b1 and the SKU level information table 14b2. As illustrated in FIG. 5, one piece of item page level information on the T-shirt 100 is stored in the item page level information table 14b1. The item page level information includes a category ID indicating the T-shirt, an item name "ABC T-shirt", an item image ID indicating the multi-SKU item image 210, and the number of SKUs indicating 6. The item page level information includes variation attribute definition information indicating "Color: white, black" and variation attribute definition information indicating "Size: S, M, L". The SKU level information table 14b2 stores six pieces of SKU level information. The variation attribute of the color included in the SKU level information on each of the T-shirts 110, 120, and 130 is set to "Color: white". The variation attribute information on the color included in the SKU level information on each of the T-shirts 140, 150, and 160 is set to "Color: black". The variation attribute information on the size included in the SKU level information on each of the T-shirts 110 and 140 is set to "Size: S". The variation attribute information on the size included in the SKU level information on each of the T-shirts 120 and 150 is set to "Size: M". The variation attribute information on the size included in the SKU level information on each of the T-shirts 130 and 160 is set to "Size: L". The SKU level information on each of the T-shirts 110, 120, and 130 includes a SKU image ID indicating the SKU image 220. The SKU level information on each of the T-shirts 140, 150, and 160 includes a SKU image ID indicating the SKU image 230.

The storage unit 14 further stores various programs such as an operating system, a DBMS (Database Management System), and a server program. The server program is a program that causes the system controller 11 to execute processing related to the online shopping mall. For example, the server program may be acquired from another device via the network NW, or may be recorded on a recording medium such as a magnetic tape, an optical disk, or a memory card and read via a drive device.

The communication unit 15 includes, for example, a network interface card or the like. The communication unit 15 is connected to the store terminal 2 and the user terminal 3 via the network NW, and controls a communication state with the connected device.

[3. Functional Outline of System Controller]

Next, a functional outline of the system controller 11 in the online shopping mall server 1 will be described with reference to FIGS. 6 to 14. FIG. 6 is a diagram illustrating an example of functional blocks of the system controller 11 in the online shopping mall server 1 according to the present embodiment. When the CPU 11a reads and executes various program codes included in the server program, the system controller 11 functions as search criteria reception unit 111, a search unit 112, a search result page transmission unit 113, an item page transmission unit 114, and the like as illustrated in FIG. 6.

[3-1. Item Search]

The search criteria reception unit 111 may receive search criteria information indicating search criteria for search for items from the user terminal 3. For example, a web page such as the home page of the online shopping mall may include a keyword input field. The search criteria reception unit 111 may receive, from the user terminal 3, text information indicating a keyword input by the user into the input field. Furthermore, a certain web page may include a menu, a list, or the like for selecting a category of an item. The search criteria reception unit 111 may receive a category ID indicating a category selected by the user from the user terminal 3 as criteria on the category. Furthermore, a certain web page may include a menu, a list, or the like for selecting a SKU attribute as an attribute of an item. This menu or the like may be normally displayed when the user has already selected the item category. For example, the attribute value of the classification indicated in the category attribute definition information stored in the category DB 14a for the selected category may be selectable. A plurality of attribute values may be selectable for one attribute classification. In addition, it may be possible to designate a range of the attribute values. The search criteria reception unit 111 may receive the attribute classification name and the attribute value or the range of the attribute value corresponding to the selected attribute from the user terminal 3 as the criteria on the attribute corresponding to the category of the item.

The search unit 112 may search for at least one of the attribute information indicating the common attribute satisfying the search criteria indicated by the search criteria information received by the search criteria reception unit 111 and the attribute information indicating the SKU attribute from the storage unit 14 that stores, in association with the web page information indicating one item page, the attribute information indicating the common attribute shared by the plurality of SKUs selectable as the purchase target on the item web page and the plurality of attribute information indicating the plurality of SKU attributes of each of the plurality of SKUs. Specifically, the attribute information used for the search is stored in the item DB 14b. Examples of the attribute information used for searching for the common attribute include an item name, category information, an item description, and the like included in the item level information. The attribute information used for the search for the SKU attribute may include at least variation attribute information included in the SKU level information, for example. The attribute information used for the search for the SKU attribute may further include other attribute information. The attribute information used for the search for the SKU attribute may further include at least one of a price, a quantity in stock, a shipping cost, and a delivery date.

For example, the search unit 112 may search for items in units of item pages. In the present embodiment, the common attributes are included in the item page level information table 14b1, and the SKU attributes are included in the SKU level information table 14b2. Therefore, the search unit 112 may combine the SKU level information table 14b2 and the item page level information table 14b1 by, for example, a combination of the item ID and the store ID included in the SKU level information. a record of the information on each SKU included in the table after the table combination includes both the common attribute sand the SKU attributes. The search unit 112 may search for records in which at least one of a common attribute and a SKU attribute satisfies the search criteria from the combined table.

For each of one or a plurality of criteria included in the search criteria, the search unit 112 may identify which attribute the criteria are for. For example, in a case where the search criteria information includes the category ID of the item, It searches for the records in which the category information on the item page level information includes a category ID matching the category ID included in the search criteria information. That is, the search unit 112 may search for SKUs satisfying the criteria on the category. When the search criteria information includes the attribute classification name and the attribute value, the search unit 112 may search for records including information indicating a SKU attribute having an attribute value matching the attribute value included in the search criteria information for the classification indicated by the attribute classification name included in the search criteria information among the pieces of SKU attribute information included in the SKU level information. That is, the search unit 112 may search for SKUs satisfying the criteria on the SKU attribute. In a case where the search criteria information includes the range of the attribute values, the search unit 112 may search for records including the information on the SKU attribute included in the range. In a case where the search criteria information includes keywords, the search unit 112 may determine, for example, which classification attribute the keywords indicate the criteria for. For example, the search unit 112 may determine whether or not the keywords indicate category criteria. The search unit 112 may search for the category name corresponding to the keywords from the category DB 14*a*. When the category name corresponds to the keywords, the category name may match or be similar to the keywords, or the category name may be a synonym of the keywords. When there is a category name corresponding to the keywords, the search unit 112 may use the keywords as criteria on the category. For example, the search unit 112 may search for records in which the category information of the item page level information includes a category ID matching the category ID indicated by the category name. Furthermore, for example, the search unit 112 may determine whether or not the keywords indicate criteria on the SKU attribute. For example, when it is determined that the search criteria includes the criteria on the category or that another keywords included in the search criteria indicates the criteria on the category, the search unit 112 may search for the category attribute definition information including the attribute value corresponding to the keywords among the pieces of category attribute definition information stored in the category DB 14*a* for the category. When the attribute value corresponds to the keywords, the attribute value may match or be similar to the keywords, the attribute value may be a synonym of the keywords, or the keywords may include a word indicating a unit of the attribute. When the category attribute definition information including the attribute value corresponding to the keywords is present, the search unit 112 may use the keywords as the criteria on the SKU attribute. For example, the search unit 112 may search for records including information indicating a SKU attribute having an attribute value matching the attribute value indicated by the keywords or information indicating a SKU attribute having an attribute value included in the attribute value range indicated by the keywords for the classification indicated by the attribute classification name included in the category attribute definition information. In a case where the keywords are neither the criteria on the category nor the criteria on the SKU attribute, the search unit 112 may use the keywords as at least one of the criteria on the item name and the criteria on the item description. For example, the search unit 112 may search for records in which at least one of the item name and the item description includes a word, a similar word, or a synonym that matches the keywords. In a case where the search criteria include a plurality of criteria, the search unit 112 may search for SKUs satisfying all of the criteria, for example.

[3-2. Display of Search Result Page]

The search result page transmission unit 113 may transmit a search result page to the user terminal 3. The search result page indicates search results of items in units of item pages. Here, as a result of the search by the search unit 112, when the common attribute of the multi-SKU item satisfies the search criteria and the search criteria does not include criteria corresponding to the SKU attributes, the search result page transmission unit 113 may transmit the search result page including the multi-SKU item information common to the plurality of SKUs included in the multi-SKU item. The criteria corresponding to the SKU attribute may be criteria on the attribute of the item, and the classification of the attribute indicated by the criteria may be criteria matching the classification of the SKU attribute. The common attribute satisfying the search criteria indicates that all the SKUs included in the multi-SKU item have the attributes indicated by the search criteria. In addition, the search criteria not including the criteria corresponding to the SKU attribute indicates that the user does not specify any criteria for the SKU attribute. That is, the user is looking for items with a particular SKU attribute. Therefore, it is considered that it is more appropriate for the user to display the information on the multi-SKU item than to display information on any SKU. The multi-SKU item information may be, for example, information related to any of a plurality of SKUs included in the multi-SKU item, or may be information common to the plurality of SKUs. On the other hand, when any of the plurality of respective SKU attributes of the plurality of SKUs included in the multi-SKU item satisfies the search criteria, the search unit 112 may transmit the search result page including the SKU information on the SKU having a SKU attribute satisfying the search criteria among the plurality of SKUs. The fact that any of the SKU attributes satisfies the search criteria indicates that the user is searching for items having a specific SKU attribute with the search criteria. In this case, it may be more appropriate for the user to display the information on the specified SKU than to display the information on the multi-SKU item. In this case, the search criteria may or may not include criteria corresponding to the common attribute. In the present embodiment, the criteria on the SKU attribute can be designated for the classification corresponding to the category selected by the user. In addition, when any keywords included in the search criteria indicates the category criteria, another keywords may be interpreted as the SKU attribute criteria. In this regard, the search unit 112 includes the SKU information in the search result page when both the category as the common attribute and the SKU attribute satisfy the search criteria. The SKU information may be, for example, information on a SKU corresponding to the SKU information, but may be information not related to at least one SKU other than the SKU corresponding to the SKU information among SKUs included in the multi-SKU item or may be information having a relatively low relevance to the at least one SKU other than the SKU corresponding to the SKU information. When including the multi-SKU item information in the search result page, the search result page transmission unit 113 may not include the SKU information in the search result page. On the other hand, when including the SKU information in the search result page, the search result page transmission unit 113 may not include the multi-SKU information in the search result page.

Each of the multi-SKU item information and the SKU information as the information to be displayed may be information determined in advance by the store to be displayed on the item page. Further, categories of semantic information may be the same or similar between the multi-SKU item information and the SKU information. The category of the semantic information may be what type of meaning the information indicates to the user. For example, the multi-SKU item information may include a multi-SKU item image. The SKU information may include a SKU image. The categories of semantic information are the same in that the multi-SKU item image and the SKU image are images related to the item.

The multi-SKU item information may include information indicating at least one of a lower limit and an upper limit of the price range of the multi-SKU item. That is, the multi-SKU item information may include information indicating at least one of a lowest price and a highest price among a plurality of respective prices of the plurality of SKUs included in the multi-SKU item. As a result, a part or all of the information indicating the price range of the multi-SKU item can be provided to the user as the information on the multi-SKU item. On the other hand, the SKU information may include information indicating a price of a SKU whose SKU attribute satisfies the search criteria.

The search result page transmission unit 113 may further include SKU attributes such as a shipping cost and a delivery date in the search result page. Here, when the multi-SKU item information indicating the lowest price is included in the search result page, the search result page transmission unit 113 may include the SKU attribute of the SKU for which the lowest price is included in the search result page among the plurality of SKUs included in the multi-SKU item in the search result page. When the multi-SKU item information indicating the highest price is included in the search result page, the search result page transmission unit 113 may include the SKU attribute of the SKU for which the highest price is included in the search result page among the plurality of SKUs included in the multi-SKU item in the search result page. When the SKU information is included in the search result page, the search result page transmission unit 113 may include the SKU attribute of the SKU of which the SKU attribute satisfies the search criteria in the search result page.

Both the multi-SKU item information and the SKU information may include an item name. For example, the item name of the multi-SKU item may be a name common to all the SKUs included in the multi-SKU item. The item name of each SKU may be an individual name of the SKU. In the present embodiment, the item name is a common attribute but not a SKU attribute. Therefore, when displaying the SKU individual item name, it is necessary to add the item name as the SKU attribute to the SKU level information.

As described above, the search unit 112 searches for items satisfying the search criteria in units of SKUs. Therefore, when all the SKUs included in the multi-SKU item satisfy the search criteria, the search result page transmission unit 113 may include the multi-SKU item information in the search result page. On the other hand, when only one SKU among the SKUs included in the multi-SKU item satisfies the search criteria, the search result page transmission unit 113 may include the SKU information on the SKU in the search result page.

FIG. 7 is a diagram illustrating an example of a search result page. As illustrated in FIG. 7, a search result page 300 may include a keyword input field 310, an attribute icon group 320, and one or more pieces of search item information 330. In the keyword input field 310, the keywords input by the user in the web page displayed immediately before the search result page 300 is displayed. The user can change the search criteria by changing the keywords in the keyword input field 310 to request the re-search of the items. The attribute icon group 320 includes a plurality of icons indicating attribute classification names. When the user selects any icon in the attribute icon group 320, the user terminal 3 displays a list of attribute values of the attribute classification corresponding to the selected icon. When the user selects the attribute value from the list, the online shopping mall server 1 performs the re-search for the items using the attribute indicated by the combination of the selected attribute value and attribute classification and the keywords displayed in the keyword input field 310 as the search criteria. The search item information 330 is information on the found item. The search item information 330 is displayed for each item page. Each piece of search item information 330 may include an item name 331, an item image 332, a price 333, a shipping cost 334, point information 335, variation information 336, a delivery date 337, and the like. When the search item information 330 indicates information on a multi-SKU item, the item name 331 is a common attribute. The item image 332, the price 333, the shipping cost 334, and the delivery date 337 change depending on how the multi-SKU item satisfies the search criteria. The point information 335 indicates a point rate and the number of points granted to the purchaser of the item. The number of points also changes depending on how the multi-SKU item satisfies the search criteria. The variation information 336 is information indicating variations of the attribute of the multi-SKU item for each attribute classification. The variation information 336 may be displayed only when the search item information 330 indicates information on a multi-SKU item.

FIG. 7 illustrates an example of a search result page in a case where a keyword "T-shirt" is input as the search criteria. Therefore, the keyword "T-shirt" is displayed in the keyword input field 310. "T-shirt" indicates a T-shirt as a category. Therefore, the search unit 112 searches for items belonging to the category of the T-shirt in units of SKUs. The T-shirts 110 to 160 shown in FIG. 4 belong to the category of the T-shirts as their common attributes. On the other hand, the search criteria do not include criteria other than the category criteria, for example, criteria such as color and size. Therefore, all of the T-shirts 110 to 160 satisfy the search criteria. Therefore, the T-shirt 100 is included in the search result. In FIG. 7, the search item information 330 displayed at the top indicates information on T-shirt 100. For example, "ABC T-shirt" is displayed as the item name 331. The item image 332 is a multi-SKU item image 210. On the other hand, the price 333 indicates the lowest price among the prices of the T-shirts 110 to 160. For example, a lowest price of 1100 yen is set for the T-shirt 120. Therefore, information of "1,100 yen -" may be displayed as the price 333. From this information, the user recognizes that the price of the T-shirt 100 is 1100 yen or more. The shipping cost 334, the point information 335, and the delivery date 337 indicate the shipping cost, the number of points, and the delivery date of the T-shirt 120, respectively. The variation information 336 indicates that no SKU attribute is selected.

FIG. 8 is a diagram illustrating another example of the search result page. FIG. 8 illustrates an example of a search result page in a case where the keywords "T-shirt black L" are input as the search criteria. "T-shirt" indicates a T-shirt as a category. In the category of the T-shirt, it is assumed that each of the color and the size is a SKU attribute. Therefore, the keywords "black" indicate a color criteria, and the keywords "L" indicates a size criteria. Therefore, the search unit 112 searches for the items belonging to the category of the T-shirt, the color of which is black, and the size of which is L in units of SKUs. Among the T-shirts 110 to 160, only the T-shirt 160 satisfies the search criteria. Therefore, the search item information 330 illustrated in FIG. 8 differs from that in FIG. 7 in the item image 332, the price 333, the shipping cost 334, the variation information 336, and the delivery date 337. For example, in FIG. 8, the item image 332 is a SKU image 230. The shipping cost 334, the point information 335, and the delivery date 337 indicate the shipping cost, the number of points, and the delivery date of the T-shirt 160, respectively. The variation information 336 indicates that black is selected as the color and L is selected as the size.

Although at least one SKU of the plurality of SKUs included in the multi-SKU item does not satisfy the search criteria, two or more SKUs may satisfy the search criteria. That is, among the plurality of respective SKU attributes of the plurality of SKUs included in the multi-SKU item, two or more SKU attributes may satisfy the search criteria. In this case, the search result page transmission unit 113 may determine whether or not respective two or more pieces of the SKU information are the same between two or more SKUs satisfying the search criteria. When the two or more pieces of the SKU information are not the same, the search result page transmission unit 113 may include the multi-SKU item information in the search result page. If the two or more pieces of the SKU information are not the same, the displayed SKU information may not be related to at least one of two or more SKU satisfying the search criteria even if the SKU information on any of the two or more SKUs satisfying the search criteria are displayed. Therefore, it is more appropriate to display the multi-SKU item information than to display the information on any SKU. On the other hand, when the two or more pieces of the SKU information are the same, the search result page transmission unit 113 may include the SKU information in the search result page. If the two or more pieces of the SKU information are the same, the SKU information is related to each of the two or more SKUs that satisfy the search criteria. Therefore, it is more appropriate to display the SKU information than to display the multi-SKU item information.

FIG. 9 is a diagram illustrating another example of the search result page. FIG. 9 illustrates an example of a search result page in a case where the keywords "T-shirt black" are input as the search criteria. "T-shirt" indicates a T-shirt as a category. The keywords "black" indicate a color criteria. Therefore, the search unit 112 searches for the items belonging to the category of the T-shirt and having the color of black in units of SKUs. Among the T-shirts 110 to 160, only the T-shirts 140 to 160 satisfy the search criteria. The item image of each of the T-shirts 140 to 160 is a SKU image 230. Therefore, the item images are the same among the T-shirts 140 to 160. Therefore, in FIG. 9, the item image 332 is a SKU image 230. Among the prices of the T-shirts 140, 150, and 160, the price of the T-shirt 140 is 1200 yen, which is the lowest price. Therefore, information of "1,200 yen -" is displayed as the price 333. The shipping cost 334, the point information 335, and the delivery date 337 indicate the shipping cost, the number of points, and the delivery date of the T-shirt 140, respectively. The variation information 336 indicates that black is selected as the color, and indicates that no size is selected.

FIG. 10 is a diagram illustrating another example of the search result page. FIG. 10 illustrates an example of the search result page in a case where the keywords "T-shirt L" are input as the search criteria. "T-shirt" indicates a T-shirt as a category. The keyword "L" indicates size criteria. Therefore, the search unit 112 searches for the items belonging to the category of the T-shirt and having the size L in units of SKUs. Among the T-shirts 110 to 160, only the T-shirts 130 and 160 satisfy the search criteria. The item image of the T-shirt 130 is a SKU image 220. The item image of the T-shirt 160 is a SKU image 230. Therefore, the item images are different between the T-shirt 130 and the T-shirt 160. Therefore, in FIG. 10, the item image 332 is a multi-SKU item image 210. Among the prices of the T-shirts 130 and 160, the price of the T-shirt 130 of 1400 yen is the lowest price. Therefore, information of "1,400 yen -" is displayed as the price 333. The shipping cost 334, the point information 335, and the delivery date 337 indicate the shipping cost, the number of points, and the delivery date of the T-shirt 130, respectively. The variation information 336 indicates that no color is selected, and indicates that L is selected as the size.

[3-3. Display of Item Page]

When at least one of the common attribute and the SKU attribute of the multi-SKU item satisfies the search criteria indicated by the search criteria information received by the search criteria reception unit 111, the item page transmission unit 114 may transmit, to the user terminal 3, the item page indicated by the web page information associated with at least one of the common attribute and the SKU attribute, which satisfies the search criteria. For example, as described above, the search unit 112 searches for items according to the search criteria designated by the user, and the search result page transmission unit 113 transmits the search result page indicating items satisfying the search criteria in units of item pages to the user terminal 3. The user terminal 3 displays the search result page. The user selects one item or one group of items corresponding to one item page from the search result page.

For example, any search item information 330 included in the search result page 300 is selected. The item page transmission unit 114 may transmit the item page of the item or the group selected by the user.

Although the types of web pages to be transmitted are different, the function of the item page transmission unit 114 and the effect of the function may be similar to the function of the search result page transmission unit 113 and the effect of the function.

For example, when the common attribute satisfies the search criteria and the search criteria does not include criteria corresponding to the SKU attributes, the item page transmission unit 114 may transmit the item page including the multi-SKU item information. On the other hand, when at least one of the plurality of respective SKU attributes of the plurality of SKUs included in the multi-SKU item satisfies the search criteria, the item page transmission unit 114 may transmit the item page including the SKU information on the SKU having the SKU attribute satisfying the search criteria among the plurality of SKU items. When including the multi-SKU item information in the item page, the item page transmission unit 114 may not include the SKU information in the search result page. On the other hand, when including the SKU information in the search result page, the item page transmission unit 114 may not include the multi-SKU information in the item page.

As in the case of generating the search result page, examples of the multi-SKU item information and the SKU image included in the item page include an item image, information indicating a price, and the like. In addition, the item page transmission unit 114 may include the SKU attribute such as the shipping cost and the delivery date in the item page by a method similar to the case of generating the search result page.

When two or more SKU attributes among the plurality of SKU attributes of each of the plurality of SKUs included in the multi-SKU item satisfy the search criteria, the item page transmission unit 114 may determine whether the SKU information is the same between the two or more SKUs satisfying the search criteria. When the SKU information is not the same, the item page transmission unit 114 may include multi-SKU item information in the item page. On the other hand, when the SKU information is the same, the item page transmission unit 114 may include the SKU information in the item page.

The item page may include an operation element to be operated by the user to select one of a plurality of respective variation attributes of a plurality of SKUs included in the multi-SKU item as an attribute of a SKU to be purchased. This operation element may indicate a selection state of the variation attribute. For example, for each variation attribute, an operation element indicating the variation attribute may be displayed on the item page. Each operation element may indicate whether or not a variation attribute corresponding to the operation element is selected, for example, by a difference in an appearance of the operation element. Examples of the appearance of the operation element include a shape, a pattern, a color, and a size of the operation element, a color and a thickness of a boundary line of the operation element, a style, a color size, and a thickness of characters displayed in the operation element. Furthermore, the operation element may include information indicating whether or not the variation attribute corresponding to the operation element is selected.

Here, in a case where the common attribute satisfies the search criteria and the search criteria does not include criteria corresponding to the variation attributes, the item page transmission unit 114 may indicate that no variation attribute is selected by the operation element. In this case, the search criteria do not specify a specific variation attribute. Therefore, it is more appropriate to allow the user to select variation attribute of a SKU to be purchased after viewing the information displayed on the item page rather than a variation attribute of any one SKU is automatically selected. On the other hand, when any one of the plurality of respective variation attributes of the plurality of SKUs included in the multi-SKU item satisfies the search criteria, the item page transmission unit 114 may case the operation element to indicate that the variation attribute satisfying the search criteria are selected. In this case, the one of the variation attributes satisfies the search criteria. Therefore, since the variation attribute satisfying the search criteria are automatically selected, it is possible to reduce the labor of the selection operation by. the user.

Figure 11:
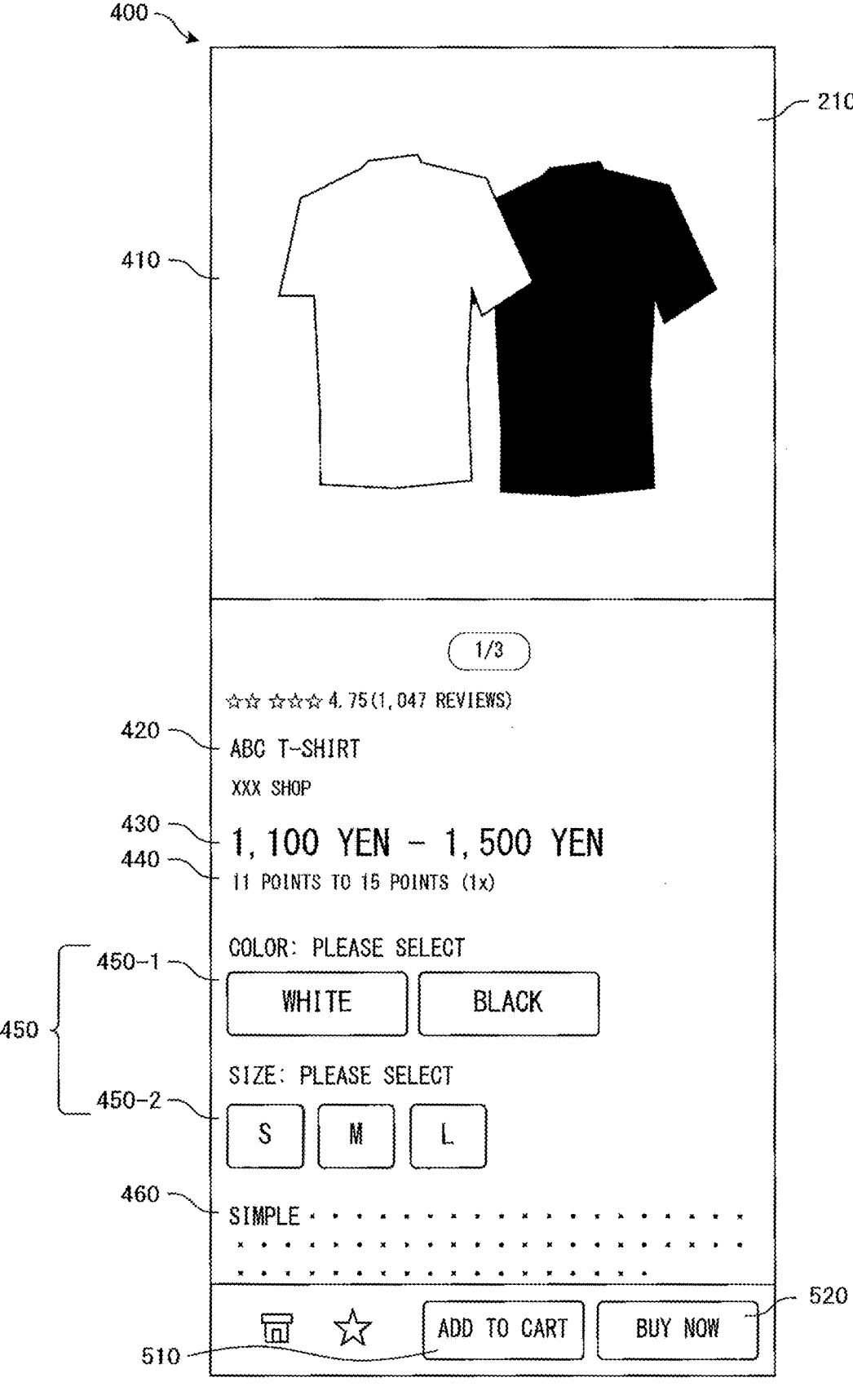
FIG. 11 is a diagram illustrating an example of an item page.

FIG. 11 is a diagram illustrating an example of an item page. As illustrated in FIG. 11, an item page 400 may include an item image 410, an item name 420, a price 430, point information 440, an attribute selection button group 450, an item description 460, and the like. In the example illustrated in FIG. 11, only one item image 410 is displayed, but a plurality of item images 410 may be displayed. The point information 440 indicates a point rate and the number of points granted to the purchaser of the item. The attribute selection button group 450 is an example of the above-described operation element. The attribute selection button group 450 is a button group for selecting a variation attribute of a SKU to be purchased among the SKUs included in the multi-SKU item. The attribute selection button group 450 indicates a currently selected variation attribute. The attribute selection button group 450 may be displayed, for example, for each attribute classification. The attribute selection button group 450 functions so that it is not possible to select an attribute or a combination of attributes of a SKU having no stock. Each button included in the attribute selection button group 450 displays information indicating an attribute value. In the example illustrated in FIG. 11, an attribute selection button group 450-1 for selecting a color and an attribute selection button group 450-2 for selecting a size are displayed. Note that the element operated to select the SKU is not limited to the button. Such an element may be an icon, a pull-down menu, or the like. In addition, instead of the element group for designating the attribute, an element group for directly designating the SKU may be displayed. On the item page 400, an add to cart button 510 and a buy now button 520 may be further displayed in an overlay manner. Each of the add to cart button 510 and the buy now button 520 is a button for selecting an item whose information is displayed on the item page as a purchase target. When the item page of the multi-SKU item is displayed, the SKU having the SKU attribute selected by the user by operating the attribute selection button group 450 is to be selected as the purchase target. The add to cart button 510 is a button for putting an item into a shopping cart. The buy now button 520 is a button for proceeding to an item purchase procedure.

The item page 400 illustrated in FIG. 11 is an item page displayed by the user terminal 3 when the user selects the search item information 330 of the T-shirt 100 from the search result page 300 illustrated in FIG. 7. Therefore, the search criteria are the keyword "T-shirt". Therefore, all of the T-shirts 110 to 160 satisfy the search criteria. Therefore, on the item page 400 illustrated in FIG. 11, the multi-SKU item image 210 is displayed as the item image 410. The price 430 indicates a lowest price and a highest price among the prices of the T-shirts 110 to 160. For example, the price 430 may display information of "1,100 yen-1,500 yen". The price 430 in this case indicates that the price of the T-shirt 100 is within the range of 1100 yen to 1500 yen. Further, "11 points-15 points (1×)" may be displayed as the point information 440. The point information 440 in this case indicates that the point rate is a one percent and the number of granted points is within the range of 11 points to 15 points.

Figure 12:
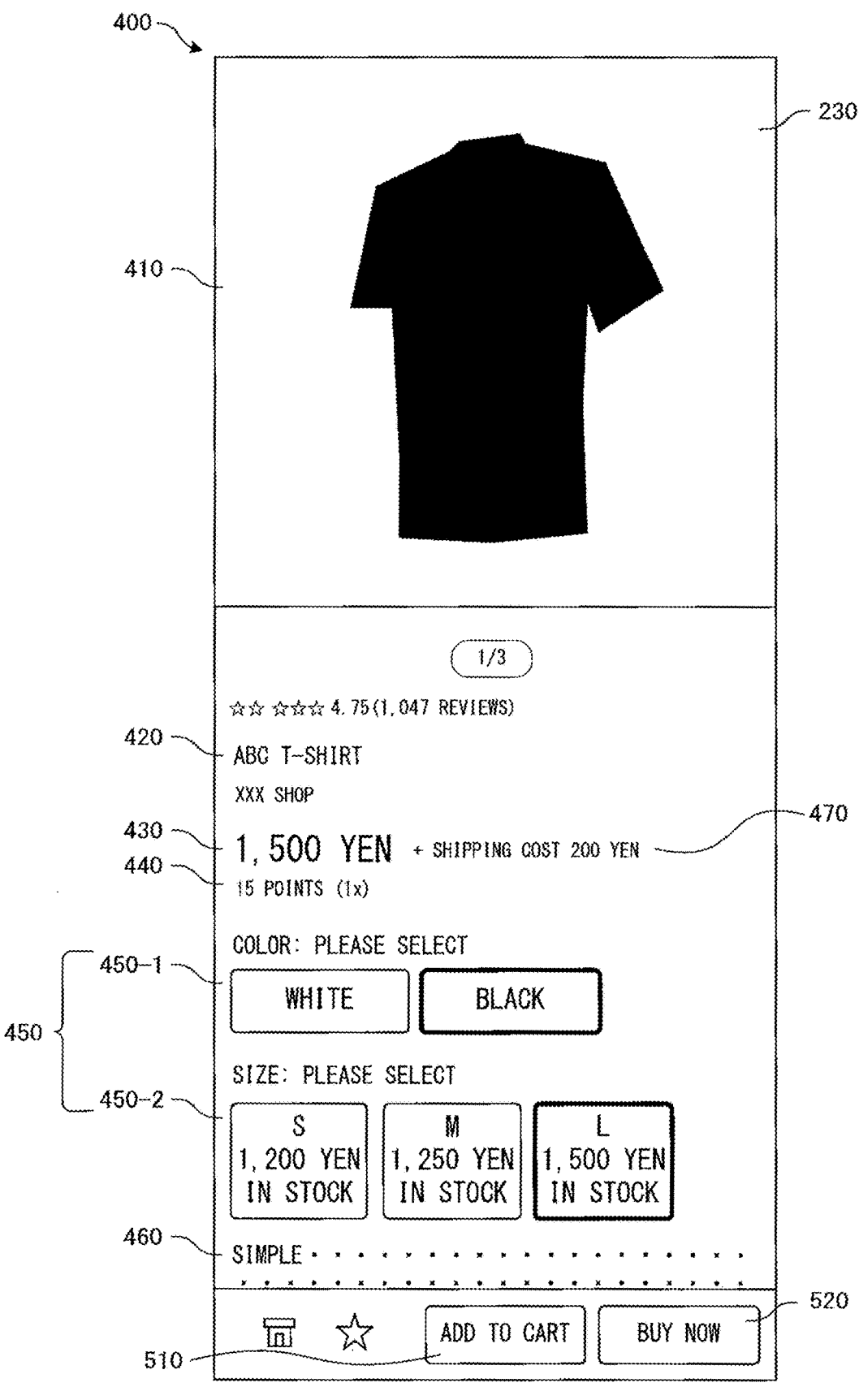
FIG. 12 is a diagram illustrating an example of an item page.

FIG. 12 is a diagram illustrating another example of the item page. An item page 400 illustrated in FIG. 12 is an item page displayed by the user terminal 3 when the user selects the search item information 330 of the T-shirt 100 from the search result page 300 illustrated in FIG. 8. Therefore, the search criteria are the keywords "T-shirt black L". Therefore, among the T-shirts 110 to 160, only the T-shirt 160 satisfies the search criteria. On the item page 400 illustrated in FIG. 12, the SKU image 230 is displayed in the item image 410. The price 430 indicates the price of the T-shirt 160. The point information 440 indicates the number of points granted to the purchaser of the T-shirt 160. A shipping cost 470 is further displayed on the item page 400. The shipping cost 470 indicates the shipping cost of the T-shirt 160. The delivery date of the T-shirt 160 may be further displayed on the item page 400. An attribute selection button group 450 indicates that a combination of attributes of T-shirt 160 is selected. For example, the attribute selection button group 450-1 indicates that black is selected as the color. The attribute selection button group 450-2 indicates that L is selected as the size. Furthermore, each button of the attribute selection button group 450-2 may indicate the price of the T-shirt corresponding to the combination of the size indicated by the button and black, and the presence or absence of stock. The user can select the T-shirt 160 as the purchase target by operating the add to cart button 510 or the buy now button 520 without expressly performing an operation on the attribute selection button group 450.

Figure 13:
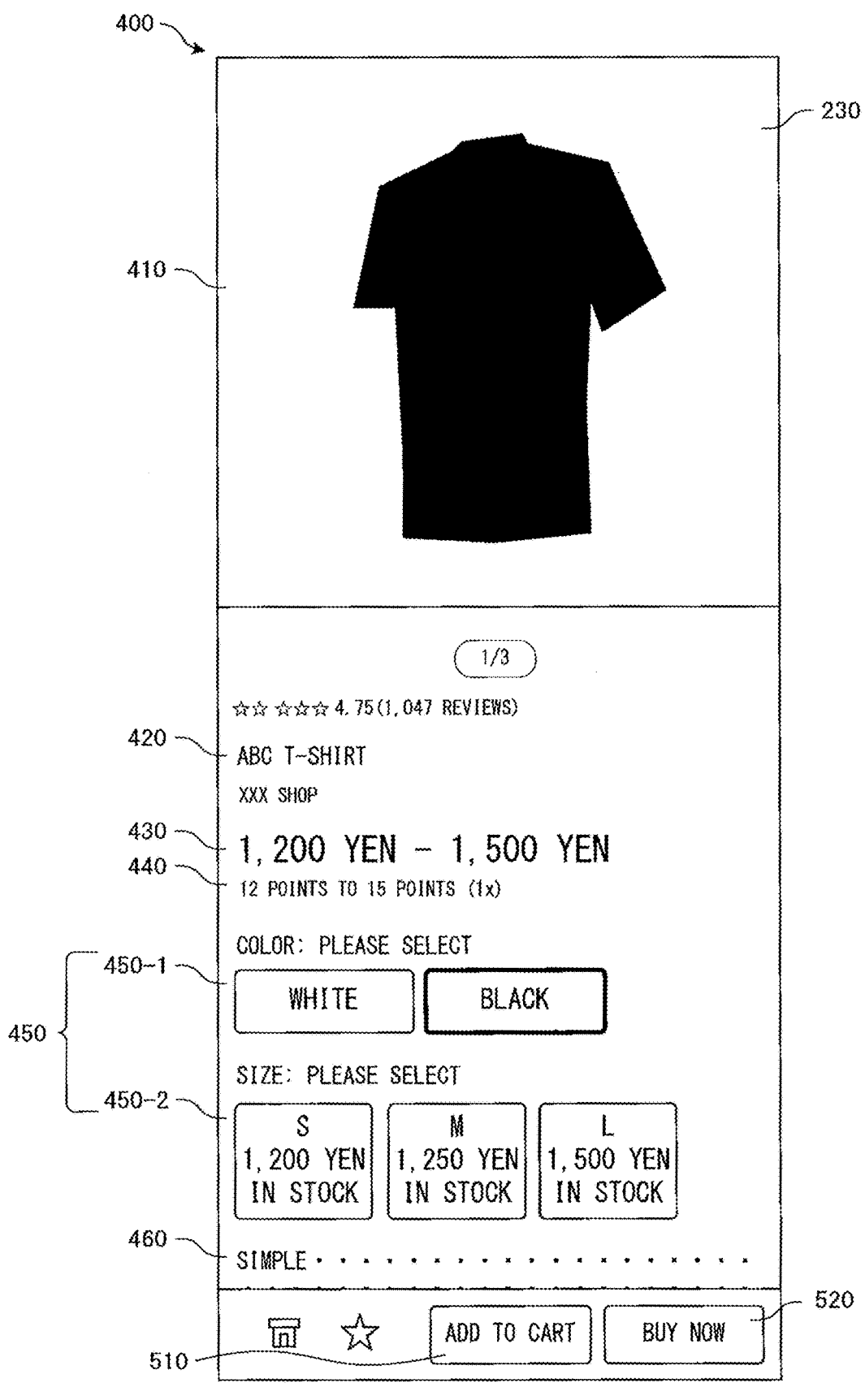
FIG. 13 is a diagram illustrating an example of an item page.

FIG. 13 is a diagram illustrating another example of the item page. An item page 400 illustrated in FIG. 13 is an item page displayed by the user terminal 3 when the user selects the search item information 330 of the T-shirt 100 from the search result page 300 illustrated in FIG. 9. Therefore, the search criteria are the keywords "T-shirt black". Therefore, among the T-shirts 110 to 160, only the T-shirts 140 to 160 satisfies the search criteria. On the item page 400 illustrated in FIG. 13, a SKU image 230 is displayed as an item image 410. The price 430 indicates a lowest price and a highest price among the prices of the T-shirts 140 to 160. The point information 440 indicates the minimum number of points and the maximum number of points among the number of points granted to the purchaser of the T-shirts 140 to 160. The attribute selection button group 450-1 indicates that black is selected as the color. The attribute selection button group 450-2 indicates that no size is selected. Furthermore, each button of the attribute selection button group 450-2 may indicate the price of the T-shirt corresponding to the combination of the size indicated by the button and black, and the presence or absence of stock. After selecting the size by operating the attribute selection button group 450-2, the user can select any one of the T-shirts 140 to 160 as the purchase target by operating the add to cart button 510 or the buy now button 520.

Figure 14:
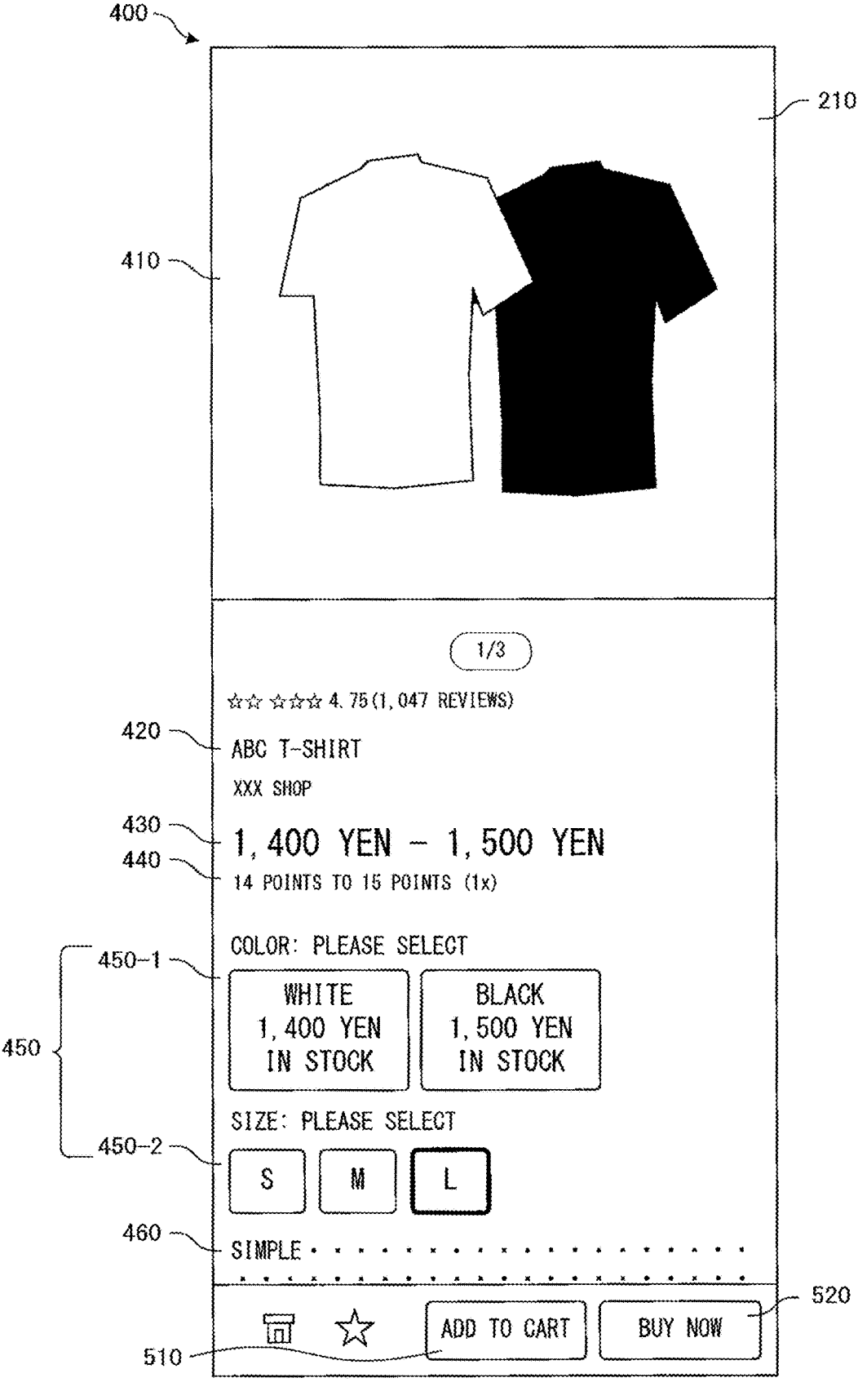
FIG. 14 is a diagram illustrating an example of an item page.

FIG. 14 is a diagram illustrating another example of the item page. An item page 400 illustrated in FIG. 14 is an item page displayed by the user terminal 3 when the user selects the search item information 330 of the T-shirt 100 from the search result page 300 illustrated in FIG. 10. Therefore, the search criteria are the keywords "T-shirt L". Therefore, among the T-shirts 110 to 160, only the T-shirts 130 and 160 satisfy the search criteria. On the item page 400 illustrated in FIG. 14, a multi-SKU item image 210 is displayed as the item image 410. The price 430 indicates a lowest price and a highest price among the prices of the T-shirts 130 and 160. The point information indicates the minimum number of points and the maximum number of points among the number of points granted to the purchasers of the T-shirts 130 and 160. The attribute selection button group 450-1 indicates that no color is selected. Furthermore, each button of the attribute selection button group 450-1 may indicate the price of the T-shirt corresponding to the combination of the color indicated by the button and the L size, and the presence or absence of stock. The attribute selection button group 450-2 indicates that L is selected as the size. After selecting a color by operating the attribute selection button group 450-1, the user can select one of the T-shirts 130 and 160 as the purchase target by operating the add to cart button 510 or the buy now button 520.

It is necessary to partially change the display content of the item page depending on how the common attribute of the multi-SKU item and each SKU attribute satisfy the search criteria. Therefore, when generating the HTML document of the item page of the multi-SKU item, the item page transmission unit 114 may specify which SKU among the SKUs included in the multi-SKU item satisfies the search criteria. Then, the item page transmission unit 114 may determine the display content based on whether all the SKUs satisfy the search criteria, one SKU satisfies the search criteria, or two or more SKUs satisfy the search criteria. For example, when the search result page transmission unit 113 generates the HTML document of the search result page to be transmitted to the user terminal 3, the SKU management ID of each SKU satisfying the search criteria among the plurality of SKUs included in the found multi-SKU item may be included in the HTML document. For example, the search result page transmission unit 113 includes the URL of the HTML document of the item page of the found multi-SKU item in the HTML document of the search result page. At this time, the search result page transmission unit 113 may add the SKU management ID of each SKU satisfying the search criteria to the URL of the HTML document of the item page. When the user selects any multi-SKU item from the search result page, the user terminal 3 transmits an item page request to the online shopping mall server 1. The request includes the URL of the HTML document of the item page of the selected multi-SKU item. The item page transmission unit 114 may acquire the SKU management ID of the SKU satisfying the search criteria from the URL transmitted from the user terminal 3.

The HTML document serving as the basis of the HTML document of the item page to be actually transmitted to the user terminal 3 in response to the request from the user terminal 3 may be stored in advance in the storage unit 14 as the item page HTML document 14c. For example, when the item information on a new item is stored in the item DB 14b or the item information is changed, the item page transmission unit 114 may generate an HTML document of an item page on the basis of the item information and store the HTML document in the storage unit 14. As an example of generating an item page HTML document, information on each SKU may or may not be included in the HTML document in advance. When the information on each SKU is included in the HTML document in advance, the item page transmission unit 114 may include a script for the user terminal 3 to determine the information to be displayed on the item page according to the selection state of the attribute indicated by the attribute selection button group 450 in the HTML document, and store the HTML document in the storage unit 14. When receiving the request for the item page from the user terminal 3, the item page transmission unit 114 may determine the selection state of the attribute on the basis of the SKU management ID included in the request. The item page transmission unit 114 may add information indicating the determined selection state to the HTML document of the item page and transmit the HTML document to the user terminal 3. The user terminal 3 may determine the item image 410, the price 430, the point information 440, the shipping cost 470, and the like to be displayed on the item page according to the script included in the HTML document and the information indicating the selection state of the attribute, and determine the selection state of the attribute indicated by the attribute selection button group 450. When the information on each SKU is not included in the HTML document in advance, the item page transmission unit 114 may add only information common to all the SKUs such as the item name 420 and the item description 460 to the HTML document of the item page. The item page transmission unit 114 does not add the URL, the price 430, the point information 440, and the shipping cost 470 of the item image

410 to this HTML document. In addition, the item page transmission unit 114 adds a tag for displaying the attribute selection button group 450 to the HTML document. Here, the item page transmission unit 114 sets any variation attribute to the unselected state. For example, in the stylesheet included in the HTML document, the item page transmission unit 114 may set the information indicating the appearance of each button included in the attribute selection button group 450 to the information indicating the appearance indicating unselected. The item page transmission unit 114 may store the HTML document in the storage unit 14. When receiving the request for the item page from the user terminal 3, the item page transmission unit 114 may determine the item image 410, the price 430, the point information 440, the shipping cost 470, and the like to be displayed on the item page on the basis of the SKU management ID included in the request. Then, the item page transmission unit 114 may add the determined price 430, the point information 440, the shipping cost 470, and the like to the HTML document of the item page together with the URL of the determined item image 410. Furthermore, the item page transmission unit 114 may determine the selection state of the attribute, and rewrite the HTML document of the item page such that the attribute selection button group 450 indicates the determined selection state. For example, in the stylesheet included in the HTML document, the item page transmission unit 114 may change the information indicating the appearance of each button included in the attribute selection button group 450 to the information indicating the appearance according to the selected state of the variation attribute corresponding to the button. Then, the item page transmission unit 114 may display the HTML document of the item page on the user terminal 3. Note that the display content of the item page of the single-SKU item does not change depending on the attribute selection state. Therefore, the HTML document of the item page stored in advance in the storage unit 14 for the single-SKU item may include all necessary information in advance. Then, the item page transmission unit 114 may transmit the HTML document stored in the storage unit 14 to the user terminal 3 as it is.

The display content of the item page may change according to the user's operation on the item page. For example, the item image 410 may be changed to another item image 410 according to an operation on the item image 410. For example, when the user swipes the item image 410, the item image 410 may change in the order of the multi-SKU item image, the first SKU image, the second SKU image, and the like. In the item page illustrated in FIG. 11, the multi-SKU item image 210 is displayed first. In response to a user operation on the multi-SKU item image 210, the user terminal 3 may display the SKU image 220. In response to the user's operation on the SKU 220, the user terminal 3 may display the SKU image 230. In the item page illustrated in FIG. 12, the SKU image 230 is displayed first. In response to the user operation on the SKU image 230, the user terminal 3 may display the multi-SKU item image 210. In response to the user's operation on the multi-image SKU 210, the user terminal 3 may display the SKU image 220. The item page transmission unit 114 may download the image data of all the item images including the item image 410 displayed first, and include a script for changing the item image according to the operation on the item image in the HTML document of the item page.

The display of at least one of the item image 410, the price 430, the point information 440, and the shipping cost 470 may change according to the user's operation on the attribute selection button group 450. For example, the display content may change such that the selection state of the attribute in the attribute selection button group 450 matches the display content of the item page. Specifically, the display content may be as illustrated in FIGS. 11 to 14. For example, when the user operates the attribute selection button group 450-1 to select black while the item page 400 illustrated in FIG. 11 is displayed, the user terminal 3 may display the item page 400 illustrated in FIG. 13. On the other hand, when the user operates the attribute selection button group 450-2 to select the L size, the user terminal 3 may display the item page 400 illustrated in FIG. 14. Furthermore, for example, when the user operates the attribute selection button group 450-2 to select the L size while the item page 400 illustrated in FIG. 13 is displayed, the user terminal 3 may display the item page 400 illustrated in FIG. 12. Furthermore, for example, it is assumed that the user operates the attribute selection button group 450-1 to select white when the item page 400 illustrated in FIG. 12 is displayed. In this case, the user designates the T-shirt 130. Then, the user terminal 3 may display the SKU image 220 as the item image 410. Further, the user terminal 3 may display the information on the T-shirt 130 as the price 430, the point information 440, and the shipping cost 470. When the information on each SKU is included in the HTML document of the item page in advance as described above, the user terminal 3 may dynamically change the display of the item page according to a script. When the information on each SKU is not included in advance in the HTML document of the item page, the HTML document may include the script for transmitting the selection state of the attribute or the list of the SKU management IDs corresponding to the selection state to the online shopping mall server 1. When the attribute selection state changes in response to the operation of the attribute selection button group 450, the user terminal 3 transmits the attribute selection state or the list of SKU management IDs corresponding to the selection state to the online shopping mall server 1. The item page transmission unit 114 transmits the URL, the price, the point information, the shipping cost, and the like of the item image to be displayed on the item page to the user terminal 3 according to the information transmitted from the user terminal 3. The user terminal 3 may dynamically change the display of the item page with the information transmitted from the online shopping mall server 1.

[4. Operation of Online Shopping Mall Server]

Next, the operation of the online shopping mall server 1 will be described with reference to FIGS. 15 to 17. The system controller 11 executes the processing illustrated in FIGS. 15 to 17 according to various program codes included in the server program.

Figure 15:
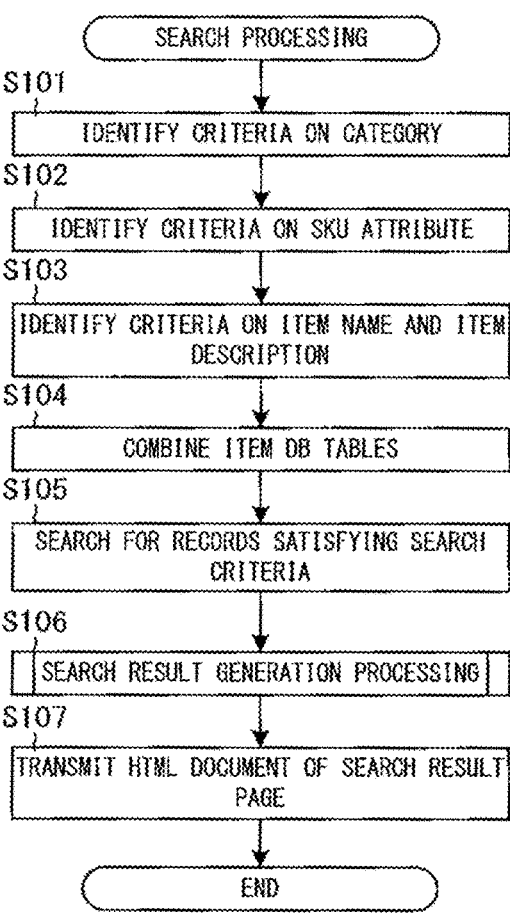
FIG. 15 is a flowchart illustrating an example of search processing executed by the system controller of the online shopping mall server.

FIG. 15 is a flowchart illustrating an example of search processing executed by the system controller 11 of the online shopping mall server 1. For example, the system controller 11 executes search processing in response to the online shopping mall server 1 receiving a search request from any of the user terminals 3. The search request includes search criteria information input by the user.

As illustrated in FIG. 15, first, the search unit 112 specifies criteria on a category from the search criteria information (step S101). For example, in a case where the search criteria information includes the category ID, the search unit 112 may identify the category ID as the criteria on the category. In a case where the search criteria information includes keywords, the search unit 112 may determine whether or not any keywords indicate a category. For example, the search unit 112 may search for the category name corresponding to the keywords from the category DB 14a. When there is a category name corresponding to the keywords, the search unit 112 may identify a category ID stored in the category DB 14a in association with the category name as criteria on the category.

Next, the search unit 112 identifies SKU attribute criteria from the search criteria information (step S102). For example, when the search criteria information include a combination of the attribute classification name and the attribute value, the combination may be identified as the criteria on the SKU attribute. When the criteria on the category are identified in step S101 and the search criteria information include the keywords that are not interpreted as the criteria on the category, the search unit 112 may determine whether or not the keywords indicate the attribute. For example, the search unit 112 may search for the attribute value corresponding to the keywords from each piece of category attribute definition information stored in the category DB 14a in association with the category ID of the category indicated by the category criteria from the category DB 14a. When there is an attribute value corresponding to the keywords, a combination of the attribute value and the attribute classification name corresponding to the attribute value may identify the criteria on the SKU attribute.

Next, the search unit 112 identifies the criteria on the item name and the item description (step S103). For example, the search unit 112 may identify keywords that have not been interpreted as criteria on a category or criteria on a SKU attribute as criteria on an item name and an item description.

Next, the search unit 112 combines the item level information table 14b1 and the SKU level information table 14b2 of the item DB 14b by a combination of the item ID and the store ID (step S104). As a result, each record in the combined table includes SKU level information and also includes item page level information that includes the same combination as the combination of the item ID and the store ID included in the SKU level information.

Next, the search unit 112 searches for records satisfying the search criteria from the combined table (step S105). For example, the search unit 112 may search for records in which the category information includes the category ID indicating the criteria on the category, any of the variation attribute information includes the combination of the attribute classification name indicating the criteria on the SKU attribute and the attribute value, and either one of the item name and the item description includes the keywords as the criteria on the item name and the item description. At least one of the criteria on the category, the criteria on the SKU attribute, and the criteria on the item name and the item description may not be identified. In this case, the search unit 112 may search for records satisfying all the criteria within a range of the designated type of criteria.

Next, the search result page transmission unit 113 executes search result generation processing (step S106). In the search result generation processing, the search result page transmission unit 113 generates an HTML document of the search result page. Next, the search result page transmission unit 113 transmits the generated HTML document of the search result page to the user terminal 3 (step S107), and the search processing ends.

FIG. 16 is a flowchart illustrating an example of search result generation processing executed by the system controller 11 of the online shopping mall server 1. As illustrated in FIG. 16, first, the search result page transmission unit 113 makes groups of records found in step S105 of the search processing in units of item pages (step 201). For example, the search result page transmission unit 113 may form one group with a plurality of records including a combination of the same item ID and store ID. Further, the search result page transmission unit 113 acquires an HTML document serving as a template of the HTML document of the search result page. Next, the search result page transmission unit 113 selects any one of the classified groups (step S202). Furthermore, the search result page transmission unit 113 acquires tag data serving as a template of tag data for displaying the search item information 330. The tag data includes a tag and information which are commonly necessary for all items. Next, the search result page transmission unit 113 adds the item name included in the item page level information in the record of the selected group to the tag data of the search item information 330 (step S203).

Next, the search result page transmission unit 113 determines whether or not the record of the selected group is a record of a single-SKU item (step S204). For example, when the number of SKUs included in the item page level information in the record indicates 1, the search result page transmission unit 113 may determine that the record of the selected group is a record of a single-SKU item (step S204: YES). In this case, the search result page transmission unit 113 acquires the URL of the single-SKU item image based on the item image ID included in the item page level information in the record (step S205). Next, the search result page transmission unit 113 acquires the price, the shipping cost, and the delivery date from the SKU level information in the record (step S206).

On the other hand, if the record of the selected group is not a record of a single-SKU item (step S204: NO), the search result page transmission unit 113 determines whether the selected group includes records of all SKUs included in the multi-SKU item (step S207). For example, the search result page transmission unit 113 may count the number of records included in the group. Then, when the number of records matches the number of SKUs included in the item page level information in any record of the selected group, the search result page transmission unit 113 may determine that the group includes records of all the SKUs (step S207: YES). In this case, the search result page transmission unit 113 acquires the URL of the multi-SKU item image based on the item image ID included in the item page level information in the record of the selected group (step S208). Next, the search result page transmission unit 113 identifies the lowest price among the prices included in each of the plurality of records included in the selected group. The search result page transmission unit 113 acquires the price, the shipping cost, and the delivery date from the SKU level information of the record including the lowest price (step S209).

On the other hand, when the selected group does not include a record of at least one SKU among the records of all the SKU included in the multi-SKU item (step S207: NO), the search result page transmission unit 113 determines whether the selected group includes only the record of one SKU (step S210). When the selected group includes only a record of one SKU (step S210: YES), the search result page transmission unit 113 acquires the URL of the SKU image based on the SKU image ID included in the SKU level information in the record (step S211). Next, the search result page transmission unit 113 acquires the price, the shipping cost, and the delivery date from the SKU level information in the record (step S212).

On the other hand, when the selected group includes records of two or more SKUs (step S210: NO), the search result page transmission unit 113 determines whether the SKU images are the same among all records included in the group (step S213). For example, if the SKU image IDs included in the SKU level information match between those records, the search result page transmission unit 113 may determine that the SKU images are the same (step S213: YES). In this case, the search result page transmission unit 113 acquires the URL of the SKU image based on the SKU image ID (step S214). On the other hand, if the SKU images are not the same (step S213: NO), the search result page transmission unit 113 acquires the URL of the multi-SKU item image based on the item image ID included in the item page level information in the record of the selected group (step S215).

After step S214 or S215, the search result page transmission unit 113 identifies the lowest price among the prices included in each of the plurality of records included in the selected group. The search result page transmission unit 113 acquires the price, the shipping cost, and the delivery date from the SKU level information of the record including the lowest price (step S216).

After step S206, S209, S212, or S216, the search result page transmission unit 113 adds the URL acquired in step S205, S208, S211, S214, or S215 to the tag data of the search item information 330 as the SRC attribute of the IMG tag of the item image 332 (step S217). Next, the search result page transmission unit 113 adds the price, the shipping cost, and the delivery date acquired in step S206, S209, S212, or S216 to the tag data of the search item information 330 as the price 333, the shipping cost 334, and the delivery date 337 (step S218). When the lowest price is included in the price 333, the search result page transmission unit 113 may generate the price 333 by adding characters such as "-" to the lowest price. In addition, the search result page transmission unit 113 acquires the point rate from the record of the selected group. The search result page transmission unit 113 calculates the number of points by multiplying the point rate by the price. Then, the search result page transmission unit 113 adds the point rate and the number of points to the tag data of the search item information 330 as the point information 335.

Next, the search result page transmission unit 113 adds the tag data of the search item information 330 to the HTML document of the search result page (step S219). Next, the search result page transmission unit 113 determines whether or not all the groups have been selected among the classified groups (step S220). When at least one group is not selected (step S220: NO), the search result page transmission unit 113 selects one of the unselected groups (step S221), and the processing proceeds to step S203. On the other hand, when all the groups have been selected (step S220: YES), the search result generation processing ends.

Figure 17:
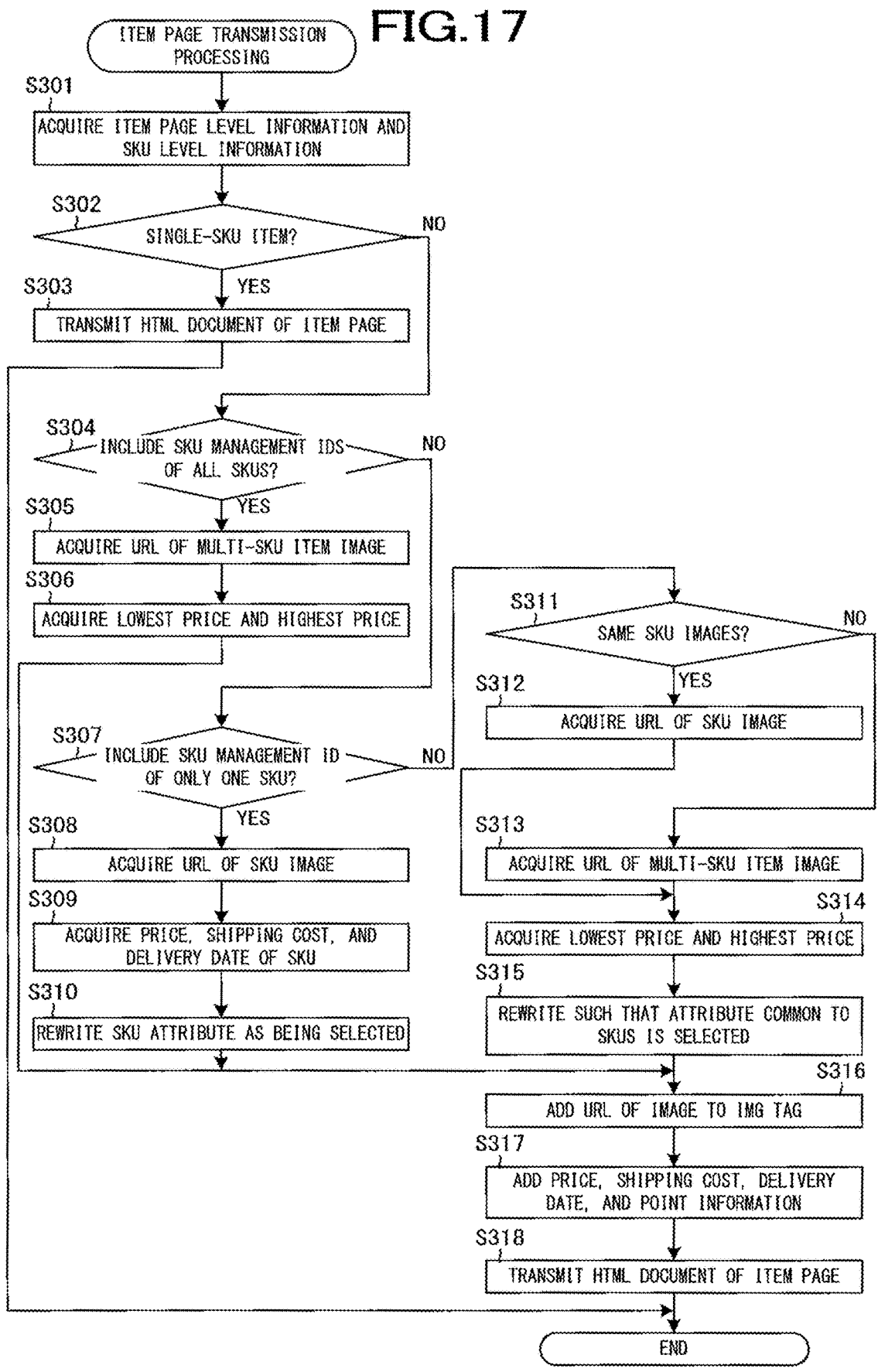
FIG. 17 is a flowchart illustrating an example of item page transmission processing executed by the system controller of the online shopping mall server.

FIG. 17 is a flowchart illustrating an example of item page transmission processing executed by the system controller 11 of the online shopping mall server 1. For example, the system controller 11 may execute the item page transmission processing in response to the online shopping mall server 1 receiving an item page request from the user terminal 3. FIG. 17 illustrates a processing example in a case where the item page HTML document 14c stored in advance in the storage unit 14 does not include information on each SKU.

As illustrated in FIG. 17, first, the item page transmission unit 114 acquires the item ID and the store ID from the URL included in the request of the item page. Then, the item page transmission unit 114 acquires the item page level information and the SKU level information including the combination of the item ID and the store ID from the item DB 14b (step S301). Furthermore, the item page transmission unit 114 acquires the HTML document of the item page associated with the URL included in the request of the item page from the storage unit 14.

Next, the item page transmission unit 114 determines whether or not the item for which the item page is requested is a single-SKU item (step S302). For example, when the number of SKUs included in the item page level information indicates 1, the item page transmission unit 114 may determine that the item for which the item page is requested is a single-SKU item (step S302: YES). In this case, the item page transmission unit 114 transmits the HTML document acquired from the storage unit 14 to the user terminal 3, and the item page transmission processing ends.

On the other hand, if the item for which the item page is requested is not a single-SKU item (step S302: NO), the item page transmission unit 114 determines whether the item page request includes the SKU management IDs of all the SKUs included in the multi-SKU item (step S304). For example, the item page transmission unit 114 may count the number of SKU management IDs included in the request of the item page. Then, when the number of SKU management IDs matches the number of SKUs included in the item page level information, the item page transmission unit 114 may determine that the request for the item page includes the SKU management IDs of all the SKUs (step S304: YES). In this case, the item page transmission unit 114 acquires the URL of the multi-SKU item image based on the item image ID included in the item page level information (step S305). Next, the item page transmission unit 114 acquires the lowest price and the highest price among the prices included in each of the plurality of pieces of SKU level information acquired from the item DB 14b (step S306).

On the other hand, when the request for the item page does not include the SKU management ID of at least one SKU among all the SKUs (step S304: NO), the item page transmission unit 114 determines whether the request for the item page includes only the SKU management ID of one SKU (step S307). When the request for the item page includes only the SKU management ID of one SKU (step S307: YES), the item page transmission unit 114 identifies the SKU level information including the SKU management ID included in the request for the item page among the pieces of SKU level information acquired from the item DB 14b. Then, the item page transmission unit 114 acquires the URL of the SKU image based on the SKU image ID included in the identified SKU level information (step S308). Next, the item page transmission unit 114 acquires the price, the shipping cost, and the delivery date from the identified SKU level information (step S309). Next, the item page transmission unit 114 acquires variation attribute information from the identified SKU level information. Then, the item page transmission unit 114 rewrites the HTML document of the item page such that the attribute selection button group 450 indicates that the variation attribute of the SKU indicated by the acquired variation attribute information has been selected (step S310).

On the other hand, when the request for the item page includes the SKU management ID of two or more SKUs (step S307: NO), the item page transmission unit 114 determines whether the SKU images are the same among the pieces of SKU level information including the SKU management ID included in the request for the item page among the pieces of SKU level information acquired from the item DB 14b (step S311). For example, when the SKU image IDs included in the SKU level information match between the SKU level information, the item page transmission unit 114 may determine that the SKU images are the same (step S311: YES). In this case, the item page transmission unit 114 acquires the URL of the SKU image based on the SKU image ID (step S312). On the other hand, if the SKU images are not the same (step S311: NO), the item page transmission unit 114 acquires the URL of the multi-SKU item image based on the item image ID included in the item page level information (step S313).

After step S312 or S313, the item page transmission unit 114 acquires the lowest price and the highest price from among the prices included in each of the SKU level information including the SKU management ID included in the request for the item page (step S314). Next, the item page transmission unit 114 identifies the same variation attribute information among the pieces of SKU level information. Then, the item page transmission unit 114 rewrites the HTML document of the item page such that the attribute selection button group 450 indicates that the variation attribute common to the SKUs indicated by the same variation attribute information has been selected (step S315).

After step S306, S310, or S315, the item page transmission unit 114 adds the URL acquired in step S305, S308, S312, or S313 to the HTML document of the item page as the SRC attribute of the IMG tag of the item image 410 (step S316). Next, the item page transmission unit 114 adds the price acquired in step S306, S309, or S314 as the price 430 (step S317). In a case where the lowest price and the highest price are included in the price 430, the item page transmission unit 114 may generate the price 430 by inserting characters such as "-" between the lowest price and the highest price. When the shipping cost and the delivery date are acquired in step S309, the item page transmission unit 114 also adds the shipping cost and the delivery date to the HTML document. In addition, the item page transmission unit 114 acquires the point rate from the item page level information. The item page transmission unit 114 calculates the number of points by multiplying the point rate by the price. Then, the item page transmission unit 114 adds the point rate and the number of points to the HTML document as the point information 440. Next, the item page transmission unit 114 transmits the HTML document of the item page to the user terminal 3 (step S318), and the item page transmission processing ends.

As described above, in the present embodiment, the online shopping mall server 1 receives the search criteria information from the user terminal 3. The online shopping mall server 1 searches for at least one of the common attribute and the individual attribute satisfying the search criteria indicated by the search criteria information from the storage unit 14 that stores information indicating the common attribute shared by a plurality of SKUs included in the multi-SKU item and information indicating a plurality of respective individual attributes of the plurality of SKUs in association with the web page information for each item page When the common attribute satisfies the search criteria and the search criteria does not include criteria corresponding to the individual attribute, the online shopping mall server 1 may include the multi-SKU item information in the search result page. In this case, all of the plurality of SKUs satisfy the search criteria, and a specific item among the plurality of SKUs is not designated in the search criteria. Therefore, it is more appropriate to display information common to the plurality of SKUs than information on a specific SKU. On the other hand, when at least one of the plurality of individual attributes satisfies the search criteria, the online shopping mall server 1 may include the SKU information on the item having the individual attribute satisfying the search criteria in the search result page. In this case, it is more appropriate to display information on the specific SKU than information common to the plurality of SKUs. In this way, for the pluralities of SKUs each having a common item page, information related to the search criteria can be provided as a search result in units of item pages.

Further, when the common attribute satisfies the search criteria and the search criteria does not include criteria corresponding to the individual attribute, the online shopping mall server 1 may include the multi-SKU item information in the item page. On the other hand, when any of the plurality of individual attributes satisfies the search criteria, the online shopping mall server 1 may include the SKU information on the item having the individual attribute satisfying the search criteria in the item page. In this case, for a plurality of items having a common item page, information related to the search criteria can be displayed on the item web page.

The multi-SKU item information may also include images associated with a plurality of SKUs. The SKU information may also include an image associated with the SKU corresponding to the SKU information. Therefore, when the common attribute satisfies the search criteria but the search criteria does not include criteria corresponding to the individual attribute, the images related to the plurality of SKUs are displayed on the search result page or the item page. On the other hand, when the individual attribute of any SKU satisfies the search criteria, the image related to the SKU is displayed on the search result page or the item page.

Further, the multi-SKU item information may indicate at least one of the lower limit and the upper limit of the price range of the multi-SKU item. The SKU information may indicate a price of an item corresponding to the SKU information among a plurality of SKUs included in the multi-SKU item. Therefore, when the common attribute satisfies the search criteria but the search criteria does not include criteria corresponding to the individual attribute, information indicating at least one of the lower limit and the upper limit of the price range of the multi-SKU item is displayed on the search result page or the item page. As a result, the user can recognize the range of the price of the multi-SKU item. On the other hand, when the individual attribute of any SKU satisfies the search criteria, information indicating the price of the SKU is displayed on the search result page or the item page. As a result, the user can recognize the price of the SKU satisfying the search criteria.

Further, when two or more individual attributes among the plurality of individual attributes satisfy the search criteria, the online shopping mall server 1 may determine whether two or more respective pieces of SKU information are the same between two or more items having two or more respective individual attributes satisfying the search criteria. Further, when the two or more pieces of the SKU information are not the same, the online shopping mall server 1 may include the multi-SKU item information in the search result page. In this case, it is more appropriate to display multi-SKU item information common to a plurality of SKUs having a common item page than to display SKU information on any one of the two or more items. On the other hand, when the two or more pieces of the SKU information are the same, the online shopping mall server 1 may include the SKU information in the search result page. In this case, since the SKU information is related to each of the two or more SKUs, it is more appropriate to display the SKU information than to display the multi-SKU item information common to the plurality of SKUs included in the multi-SKU item.

In addition, when two or more respective pieces of the SKU information are not the same between two or more items having respective two or more individual attributes satisfying the search criteria, the online shopping mall server 1 may include the multi-SKU item information in the item page. On the other hand, when the SKU information is the same, the online shopping mall server 1 may include the SKU information in the item page.

In addition, the storage unit 14 of the online shopping mall server 1 may prestore the multi-SKU item information in association with the common attribute. The storage unit 14 may prestore the SKU information on the item having the individual attribute in association with each individual attribute included in the plurality of individual attributes. Therefore, when the common attribute satisfies the search criteria but the search criteria does not include criteria corresponding to the individual attribute, the multi-SKU item information stored in the storage unit 14 in association with the common attribute is displayed on the search result page or the item page. On the other hand, when the individual attribute of any item satisfies the search criteria, the SKU information stored in the storage unit 14 in association with the individual attribute is displayed on the search result page or the item page.

In addition, the item page may include an attribute selection button group 450. When the common attribute satisfies the search criteria and the search criteria does not include criteria corresponding to the variation attributes, the online shopping mall server 1 may cause the attribute selection button group 450 to indicate that no variation attribute is selected. In this case, it is more appropriate to allow the user to select a variation attribute of a SKU to be purchased after viewing the information displayed on the item page rather than a variation attribute of any SKU is automatically selected. On the other hand, when any one of the plurality of respective variation attributes of the plurality of SKUs included in the multi-SKU item satisfies the search criteria, the online shopping mall server 1 may cause the attribute selection button group 450 to indicate that the variation attribute satisfying the search criteria is selected. In this case, since the variation attribute satisfying the search criteria is automatically selected, it is possible to reduce the labor of the selection operation by the user.

(Appendix 1) search result page transmission device comprising: at least one memory configured to store computer program code; at least one processor configured to access the memory and operate as instructed by the computer program code, the computer program code including; reception code configured to cause at least one of the at least one processor to receive search criteria information indicating search criteria for a search for items from a terminal device; search code configured to cause at least one of the at least one processor to search a storage for at least one of common attribute information indicating a common attribute satisfying the search criteria indicated by the received search criteria information and individual attribute information indicating an individual attribute satisfying the search criteria indicated by the received search criteria information, the storage being configured to store thereon, for each of a plurality of item web pages, the common attribute information indicating the common attribute shared by a plurality of items corresponding to a respective item web page among the plurality of item web pages and the individual attribute information indicating the individual attribute possessed by each of the plurality of items corresponding to the respective item web page in addition to the common attribute, the respective item web page being configured to accept a user operation to select an item as a purchase target from the plurality of items corresponding to the respective item web page, the stored common attribute information and the stored individual attribute information being associated with web page information indicating the respective item web page; and transmission code configured to cause at least one of the at least one processor to transmit a search result web page to the terminal device, the search result web page indicating results of the search for items in units of item web pages, wherein, in response to the common attribute satisfying the search criteria and the search criteria not including criteria corresponding to individual attributes of the plurality of items, the transmission code is further configured to cause at least one of the at least one processor to include first item information common to the plurality of items in the search result web page to be transmitted, and wherein, in response to an individual attribute of at least one item of the plurality of items satisfying the search criteria, the transmission code is further configured to cause at least one of the at least one processor to include second item information on the at least one item in the search result web page to be transmitted.

(Appendix 2) The search result page transmission device according to appendix 1, wherein the first item information includes an image related to the plurality of items and the second item includes an image related to the at least one item.

(Appendix 3) The search result page transmission device according to appendix 1 or 2, wherein the first item information indicates at least one of a lower limit and an upper limit of a range of prices of the plurality of items, and the second item information indicates a price of the at least one item.

(Appendix 4) The search result page transmission device according to any one of appendixes 1 to 3, wherein in response to at least two individual attributes of at least two items among the plurality of items satisfying the search criteria, the transmission code is further configured to cause at least one of the at least one processor to determine whether at least two respective pieces of the second item information on the at least two items are the same, in response to the at least two pieces of the second item information are different, the transmission code is configured to cause at least one of the at least one processor to include the first item information in the search result web page to be transmitted, and in response to the at least two pieces of the second item information are the same, the transmission code is configured to cause at least one of the at least one processor to include one of the at least two respective pieces of the second item information on the at least two items in the search result web page to be transmitted.

(Appendix 5) The search result page transmission device according to any one of appendixes 1 to 4, wherein the storage is further configured to prestore the first item information in association with the common attribute information, and prestore, for each of the plurality of items, the second item information on a respective item in association with the individual attribute information on the respective item.

(Appendix 6) A search result page transmission method performable by a computer, the method comprising: receiving search criteria information indicating search criteria for a search for items from a terminal device; searching a storage for at least one of common attribute information indicating a common attribute satisfying the search criteria indicated by the received search criteria information and individual attribute information indicating an individual attribute satisfying the search criteria indicated by the received search criteria information, the storage being configured to store thereon, for each of a plurality of item web pages, the common attribute information indicating the common attribute shared by a plurality of items correspond-ing to a respective item web page among the plurality of item web pages and the individual attribute information indicating the individual attribute possessed by each of the plurality of items corresponding to the respective item web page in addition to the common attribute, the respective item web page being configured to accept a user operation to select an item as a purchase target from the plurality of items corresponding to the respective item web page, the stored common attribute information and the stored individual attribute information being associated with web page infor-mation indicating the respective item web page; and trans-mitting a search result web page to the terminal device, the search result web page indicating results of the search for items in units of item web pages, wherein, in response to the common attribute satisfying the search criteria and the search criteria not including criteria corresponding to indi-vidual attributes of the plurality of items, the transmitting further includes including first item information common to the plurality of items in the search result web page to be transmitted, and wherein, in response to an individual attri-bute of at least one item of the plurality of items satisfying the search criteria, the transmitting further includes includ-ing second item information on the at least one item in the search result web page to be transmitted.

(Appendix 7) A non-transitory computer readable medium storing thereon a search result page transmission program causing a computer to: receive search criteria information indicating search criteria for a search for items from a terminal device; search a storage for at least one of common attribute information indicating a common attri-bute satisfying the search criteria indicated by the received search criteria information and individual attribute informa-tion indicating an individual attribute satisfying the search criteria indicated by the received search criteria information, the storage being configured to store thereon, for each of a plurality of item web pages, the common attribute informa-tion indicating the common attribute shared by a plurality of items corresponding to a respective item web page among the plurality of item web pages and the individual attribute information indicating the individual attribute possessed by each of the plurality of items corresponding to the respective item web page in addition to the common attribute, the respective item web page being configured to accept a user operation to select an item as a purchase target from the plurality of items corresponding to the respective item web page, the stored common attribute information and the stored individual attribute information being associated with web page information indicating the respective item web page; and transmit a search result web page to the terminal device, the search result web page indicating results of the search for items in units of item web pages, wherein, in response to the common attribute satisfying the search criteria and the search criteria not including criteria corre-sponding to individual attributes of the plurality of items, the transmitting further includes including first item information common to the plurality of items in the search result web page to be transmitted, and wherein, in response to an individual attribute of at least one item of the plurality of items satisfying the search criteria, the transmitting further includes including second item information on the at least one item in the search result web page to be transmitted.

The invention claimed is:

1. A search result page transmission device comprising: at least one memory configured to store computer pro-gram code;

at least one processor configured to access the memory and operate as instructed by the computer program code, the computer program code including:

reception code configured to cause at least one of the at least one processor to receive, from a terminal device, search criteria information indicating search criteria for a search for items;

search code configured to cause at least one of the at least one processor to search a storage for at least one of: (i) common attribute information indicating a common attribute satisfying the search criteria indicated by the received search criteria information, and (ii) individual attribute information indicating an individual attribute satisfying the search criteria indicated by the received search criteria information, wherein the storage is con-figured to store thereon, for each of a plurality of item web pages:

(i) the common attribute information indicating the common attribute shared by a plurality of items corresponding to a respective item web page among the plurality of item web pages, and (ii) the individual attribute information indicating the individual attribute possessed by each of the plurality of items corresponding to the respective item web page in addition to the common attribute, and wherein the stored common attribute information and the stored individual attribute information are associated with web page information indicating the respective item web page;

first transmission code configured to cause at least one of the at least one processor to transmit information to the terminal device to cause the terminal device to display a search result interface indicating results of the search for items in units of item web pages, the transmitting comprising:

in response to the common attribute satisfying the search criteria and the search criteria not including criteria corresponding to individual attributes of the plurality of items, including, in the information transmitted, first information to cause the terminal device to display first item information common to the plurality of items in the search result interface; and in response to an individual attribute of at least one item of the plurality of items satisfying the search criteria, including, in the information transmitted, second information to cause the terminal device to display second item information on the at least one item in the search result interface; and second transmission code configured to cause at least one of the at least one processor to: upon receiving, from the terminal device, information indicating that the user has selected an item from among the plurality of items, transmit information to the terminal device to cause the terminal device to display an item web page corre-sponding to the selected item, wherein the item web page comprises an operation element configured to receive a purchase-target selection from among the plurality of items, and wherein:

when the search criteria do not include criteria corre-sponding to individual attributes of the plurality of items, the operation element on the item web page is rendered in an unselected state, and when the search criteria include criteria corresponding to at least one individual attribute of the plurality of items, the operation element on the item web page is rendered in a pre-selected state corresponding to the individual attribute indicated by the search criteria.

2. The search result page transmission device according to claim 1, wherein the first item information includes an image related to the plurality of items and the second item information includes an image related to the at least one item.

3. The search result page transmission device according to claim 1, wherein the first item information indicates at least one of a lower limit and an upper limit of a range of prices of the plurality of items, and the second item information indicates a price of the at least one item.

4. The search result page transmission device according to claim 1, wherein in response to at least two individual attributes of at least two items among the plurality of items satisfying the search criteria, the first transmission code is further configured to cause at least one of the at least one processor to determine whether at least two pieces of the second item information on the at least two items are the same, in response to the at least two pieces of the second item information are different, the first transmission code is configured to cause at least one of the at least one processor to include the first item information in the search result interface, and in response to the at least two pieces of the second item information are the same, the first transmission code is configured to cause at least one of the at least one processor to include one of the at least two pieces of the second item information on the at least two items in the search result interface.

5. The search result page transmission device according to claim 1, wherein the storage is further configured to prestore the first item information in association with the common attribute information, and prestore, for each of the plurality of items, the second item information on a respective item in association with the individual attribute information on the respective item.

6. A search result page transmission method performable by a computer, the method comprising:

receiving, from a terminal device, search criteria information indicating search criteria for a search for items;

searching a storage for at least one of: (i) common attribute information indicating a common attribute satisfying the search criteria indicated by the received search criteria information, and (ii) individual attribute information indicating an individual attribute satisfying the search criteria indicated by the received search criteria information, wherein the storage is configured to store thereon, for each of a plurality of item web pages:

(i) the common attribute information indicating the common attribute shared by a plurality of items corresponding to a respective item web page among the plurality of item web pages, and (ii) the individual attribute information indicating the individual attribute possessed by each of the plurality of items corresponding to the respective item web page in addition to the common attribute, and wherein the stored common attribute information and the stored individual attribute information are associated with web page information indicating the respective item web page;

transmitting information to the terminal device to cause the terminal device to display a search result interface indicating results of the search for items in units of item web pages, the transmitting comprising:

in response to the common attribute satisfying the search criteria and the search criteria not including criteria corresponding to individual attributes of the plurality of items, including, in the information transmitted, first information to cause the terminal device to display first item information common to the plurality of items in the search result interface; and in response to an individual attribute of at least one item of the plurality of items satisfying the search criteria, including, in the information transmitted, second information to cause the terminal device to display second item information on the at least one item in the search result interface; and upon receiving, from the terminal device, information indicating that the user has selected an item from among the plurality of items, transmitting information to the terminal device to cause the terminal device to display an item web page corresponding to the selected item, wherein the item web page comprises an operation element configured to receive a purchase-target selection from among the plurality of items, and wherein:

when the search criteria do not include criteria corresponding to individual attributes of the plurality of items, the operation element on the item web page is rendered in an unselected state, and when the search criteria include criteria corresponding to at least one individual attribute of the plurality of items, the operation element on the item web page is rendered in a pre-selected state corresponding to the individual attribute indicated by the search criteria.

7. A non-transitory computer readable medium storing thereon a search result page transmission program causing a computer to:

receive, from a terminal device, search criteria information indicating search criteria for a search for items;

search a storage for at least one of: (i) common attribute information indicating a common attribute satisfying the search criteria indicated by the received search criteria information, and (ii) individual attribute information indicating an individual attribute satisfying the search criteria indicated by the received search criteria information, wherein the storage is configured to store thereon, for each of a plurality of item web pages:

(i) the common attribute information indicating the common attribute shared by a plurality of items corresponding to a respective item web page among the plurality of item web pages, and (ii) the individual attribute information indicating the individual attribute possessed by each of the plurality of items corresponding to the respective item web page in addition to the common attribute, wherein the stored common attribute information and the stored individual attribute information are associated with web page information indicating the respective item web page;

transmit information to the terminal device to cause the terminal device to display a search result interface indicating results of the search for items in units of item web pages, the transmitting comprising:

in response to the common attribute satisfying the search criteria and the search criteria not including criteria corresponding to individual attributes of the plurality of items, including, in the information transmitted, first information to cause the terminal device to display first item information common to the plurality of items in the search result interface; and in response to an individual attribute of at least one item of the plurality of items satisfying the search criteria, including, in the information transmitted, second information to cause the terminal device to display second item information on the at least one item in the search result interface; and upon receiving, from the terminal device, information indicating that the user has selected an item from among the plurality of items, transmit information to the terminal device to cause the terminal device to display an item web page corresponding to the selected item, wherein the item web page comprises an operation element configured to receive a purchase-target selection from among the plurality of items, and wherein:

when the search criteria do not include criteria corresponding to individual attributes of the plurality of items, the operation element on the item web page is rendered in an unselected state, and when the search criteria include criteria corresponding to at least one individual attribute of the plurality of items, the operation element on the item web page is rendered in a pre-selected state corresponding to the individual attribute indicated by the search criteria.

\* \* \* \* \*